US012783817B2

(12) United States Patent
Dressler, II

(10) Patent No.: US 12,783,817 B2
(45) Date of Patent: Nov. 3, 2026

(54) DATABASE SYSTEMS AND METHODS FOR PERSONALIZED AGENT AUTOMATIONS

(71) Applicant: Salesforce, Inc., San Francisco, CA (US)

(72) Inventor: William Edward Dressler, II, Stallings, NC (US)

(73) Assignee: Salesforce, Inc.

(*) Notice: Subject to any disclaimer, the term of this patent is extended or adjusted under 35 U.S.C. 154(b) by 163 days.

(21) Appl. No.: 18/734,932

(22) Filed: Jun. 5, 2024

(65) Prior Publication Data

US 2024/0403567 A1 Dec. 5, 2024

Related U.S. Application Data

(60) Provisional application No. 63/506,298, filed on Jun. 5, 2023.

(51) Int. Cl.
*G06F 40/35* (2020.01)
*G06F 16/9032* (2019.01)
(Continued)

(52) U.S. Cl.
CPC ........ *G06F 40/35* (2020.01); *G06F 16/90332* (2019.01); *G06F 40/40* (2020.01); *H04L 51/02* (2013.01); *H04L 67/306* (2013.01)

(58) Field of Classification Search
CPC .. G06F 16/90332; G06F 3/0482; G06F 40/30; G06F 16/3329; G06F 16/535; G06F 16/538; G06F 16/56; G06F 16/9535; G06F 3/0481; G06F 40/35; G06F 8/20; G06F 8/34; G06F 16/3344; G06F 16/951; G06F 16/9574; G06F 16/9577; G06F 16/972; G06F 3/04817; G06F 3/04842; G06F 3/167; G06F 40/166; G06F 40/174; G06F 11/3068; G06F 16/2228; G06F 16/254; G06F 16/337; G06F 16/35; G06F 16/353;
(Continued)

(56) References Cited

U.S. PATENT DOCUMENTS 5,577,188 A 11/1996 Zhu
5,608,872 A 3/1997 Schwartz et al.
(Continued)

*Primary Examiner* — Abdelali Serrou
(74) *Attorney, Agent, or Firm* — Ingrassia Fisher & Lorenz, LLP

(57) ABSTRACT

Database systems and methods are provided for personalized automation agents. One method involves determining an action to be performed on behalf of a user, identifying a relevant subset of data in a database of the database system associated with the user based on the action, generating a personalized input prompt for an execution plan for the action using the using that subset of data, providing the personalized input prompt to a service configurable to generate a personalized conversational response, receiving the personalized conversational response comprising textual content indicative of a sequence of steps of the execution plan from the service, automatically executing the execution plan in accordance with the sequence using the service to perform the action with respect to a data record in the database, and automatically providing a response to the client device indicative of the action with respect to the data record.

20 Claims, 8 Drawing Sheets

(51) Int. Cl.
*G06F 40/40* (2020.01)
*H04L 51/02* (2022.01)
*H04L 67/306* (2022.01)

(58) Field of Classification Search
CPC .. G06F 16/435; G06F 16/438; G06F 16/5866; G06F 16/73; G06F 16/9538; G06F 21/577; G06F 2206/1008; G06F 3/0484; G06F 3/04847; G06F 3/0486; G06F 3/04883; G06F 3/0605; G06F 3/0631; G06F 3/0674; G06F 3/1207; G06F 3/121; G06F 3/1229; G06F 3/1259; G06F 3/165; G06F 40/279; G06F 40/40; G06F 9/453; G10L 15/22; G10L 25/63; G10L 13/00; G10L 13/02; G10L 13/047; G10L 15/02; G10L 15/063; G10L 15/1815; G10L 15/1822; G10L 15/183; G10L 13/027; G10L 25/03; G10L 25/30; G10L 25/48; G10L 15/00; G10L 15/20; G10L 15/26
See application file for complete search history.

(56) References Cited

U.S. PATENT DOCUMENTS 5,649,104 A 7/1997 Carleton et al.
5,715,450 A 2/1998 Ambrose et al.
5,761,419 A 6/1998 Schwartz et al.
5,819,038 A 10/1998 Carleton et al.
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
6,092,083 A 7/2000 Brodersen et al.
6,161,149 A 12/2000 Achacoso et al.
6,169,534 B1 1/2001 Raffel et al.
6,178,425 B1 1/2001 Brodersen et al.
6,189,011 B1 2/2001 Lim et al.
6,216,135 B1 4/2001 Brodersen et al.
6,233,617 B1 5/2001 Rothwein et al.
6,266,669 B1 7/2001 Brodersen et al.
6,295,530 B1 9/2001 Ritchie et al.
6,324,568 B1 11/2001 Diec et al.
6,324,693 B1 11/2001 Brodersen et al.
6,336,137 B1 1/2002 Lee et al.
D454,139 S 3/2002 Feldcamp et al.
6,367,077 B1 4/2002 Brodersen et al.
6,393,605 B1 5/2002 Loomans
6,405,220 B1 6/2002 Brodersen et al.
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans et al.
6,732,095 B1 5/2004 Warshavsky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,772,229 B1 8/2004 Achacoso et al.
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker
6,829,655 B1 12/2004 Huang et al.
6,842,748 B1 1/2005 Warner et al.
6,850,895 B2 2/2005 Brodersen et al.
6,850,949 B2 2/2005 Warner et al.
7,062,502 B1 6/2006 Kesler
7,069,231 B1 6/2006 Cinarkaya et al.
7,181,758 B1 2/2007 Chan
7,289,976 B2 10/2007 Kihneman et al.
7,340,411 B2 3/2008 Cook
7,356,482 B2 4/2008 Frankland et al.
7,401,094 B1 7/2008 Kesler
7,412,455 B2 8/2008 Dillon
7,508,789 B2 3/2009 Chan
7,620,655 B2 11/2009 Larsson et al.
7,698,160 B2 4/2010 Beaven et al.
7,730,478 B2 6/2010 Weissman
7,779,475 B2 8/2010 Jakobson et al.
8,014,943 B2 9/2011 Jakobson
8,015,495 B2 9/2011 Achacoso et al.
8,032,297 B2 10/2011 Jakobson
8,082,301 B2 12/2011 Ahlgren et al.
8,095,413 B1 1/2012 Beaven
8,095,594 B2 1/2012 Beaven et al.
8,209,308 B2 6/2012 Rueben et al.
8,275,836 B2 9/2012 Beaven et al.
8,457,545 B2 6/2013 Chan
8,484,111 B2 7/2013 Frankland et al.
8,490,025 B2 7/2013 Jakobson et al.
8,504,945 B2 8/2013 Jakobson et al.
8,510,045 B2 8/2013 Rueben et al.
8,510,664 B2 8/2013 Rueben et al.
8,566,301 B2 10/2013 Rueben et al.
8,646,103 B2 2/2014 Jakobson et al.
10,599,454 B2 3/2020 Bailey
11,269,668 B2 3/2022 Bailey
11,289,082 B1 * 3/2022 Lacy ........................ G10L 15/02
11,321,422 B1 5/2022 Stone et al.
11,444,893 B1 9/2022 Kalluri
11,797,638 B2 10/2023 Stone et al.
12,411,945 B1 9/2025 Colon
12,417,356 B2 * 9/2025 Bendersky .............. G06F 40/30
2001/0044791 A1 11/2001 Richter et al.
2002/0072951 A1 6/2002 Lee et al.
2002/0082892 A1 6/2002 Raffel
2002/0129352 A1 9/2002 Brodersen et al.
2002/0140731 A1 10/2002 Subramanian et al.
2002/0143997 A1 10/2002 Huang et al.
2002/0162090 A1 10/2002 Parnell et al.
2002/0165742 A1 11/2002 Robbins
2003/0004971 A1 1/2003 Gong
2003/0018705 A1 1/2003 Chen et al.
2003/0018830 A1 1/2003 Chen et al.
2003/0066031 A1 4/2003 Laane et al.
2003/0066032 A1 4/2003 Ramachandran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker et al.
2003/0120675 A1 6/2003 Stauber et al.
2003/0151633 A1 8/2003 George et al.
2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio et al.

(56) References Cited

U.S. PATENT DOCUMENTS

2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2006/0021019 A1 1/2006 Hinton et al.
2008/0249972 A1 10/2008 Dillon
2009/0063414 A1 3/2009 White et al.
2009/0100342 A1 4/2009 Jakobson
2009/0177744 A1 7/2009 Marlow et al.
2011/0247051 A1 10/2011 Bulumulla et al.
2012/0042218 A1 2/2012 Cinarkaya et al.
2012/0218958 A1 8/2012 Rangaiah
2012/0233137 A1 9/2012 Jakobson et al.
2013/0212497 A1 8/2013 Zelenko et al.
2013/0218948 A1 8/2013 Jakobson
2013/0218949 A1 8/2013 Jakobson
2013/0218966 A1 8/2013 Jakobson
2013/0247216 A1 9/2013 Cinarkaya et al.
2020/0090659 A1 3/2020 Castelli
2020/0342179 A1 10/2020 Lin
2021/0165967 A1* 6/2021 Shek .................... G06F 40/295
2022/0070515 A1 3/2022 Manchanda
2022/0245206 A1 8/2022 Stone et al.
2024/0185834 A1 6/2024 Aharoni
2024/0194180 A1 6/2024 Goldshtein
2024/0256792 A1* 8/2024 Maschmeyer .......... G06F 40/40
2024/0403564 A1* 12/2024 Bendersky .............. G06F 40/30

* cited by examiner

DATABASE SYSTEMS AND METHODS FOR PERSONALIZED AGENT AUTOMATIONS

CROSS-REFERENCE TO RELATED APPLICATION(S)

This application claims the benefit of U.S. Provisional Application No. 63/506,298, filed Jun. 5, 2023, which is incorporated by reference herein in its entirety.

This application is related to U.S. patent application Ser. No. 18/734,924, filed concurrently herewith.

TECHNICAL FIELD

One or more implementations relate to the field of database systems, and more specifically, to customizing or personalizing interactions with artificial intelligence systems capable of automatically responding to conversational user input.

BACKGROUND

Modern software development has evolved towards web applications and cloud-based applications that provide access to data and services via the Internet or other networks. Businesses also increasingly interface with customers using different electronic communications channels, including online chats, text messaging, email or other forms of remote support. Artificial intelligence (AI) may also be used to provide information to users via online communications with "chatbots" or other automated interactive tools. Using chat-bots, automated AI systems conduct text-based chat conversations with users, through which users request and receive information. Chatbots or other AI systems generally provide information to users for predetermined situations and applications, and in practice, may be limited depending on the nature of the training data utilized to develop the chatbot.

Chatbots or other AI systems have been developed using large language models (LLMs) that have access to or knowledge of a larger data set and vocabulary, such that they are more likely to have applicable information for a wide range of potential input prompts. That said, there may still be scenarios where the chatbot or AI system does not have access to all applicable information or is otherwise unable to provide a satisfactory answer. For example, LLMs may lack context or other understanding of information or situations that are not represented within their training data, which can impair the ability of LLMs to provide accurate or contextually relevant responses. Accordingly, it is desirable to provide systems and methods that facilitate more accurate and contextually relevant output responses from a chatbot or other AI system to a particular input prompt that might otherwise be outside the scope of the training data.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
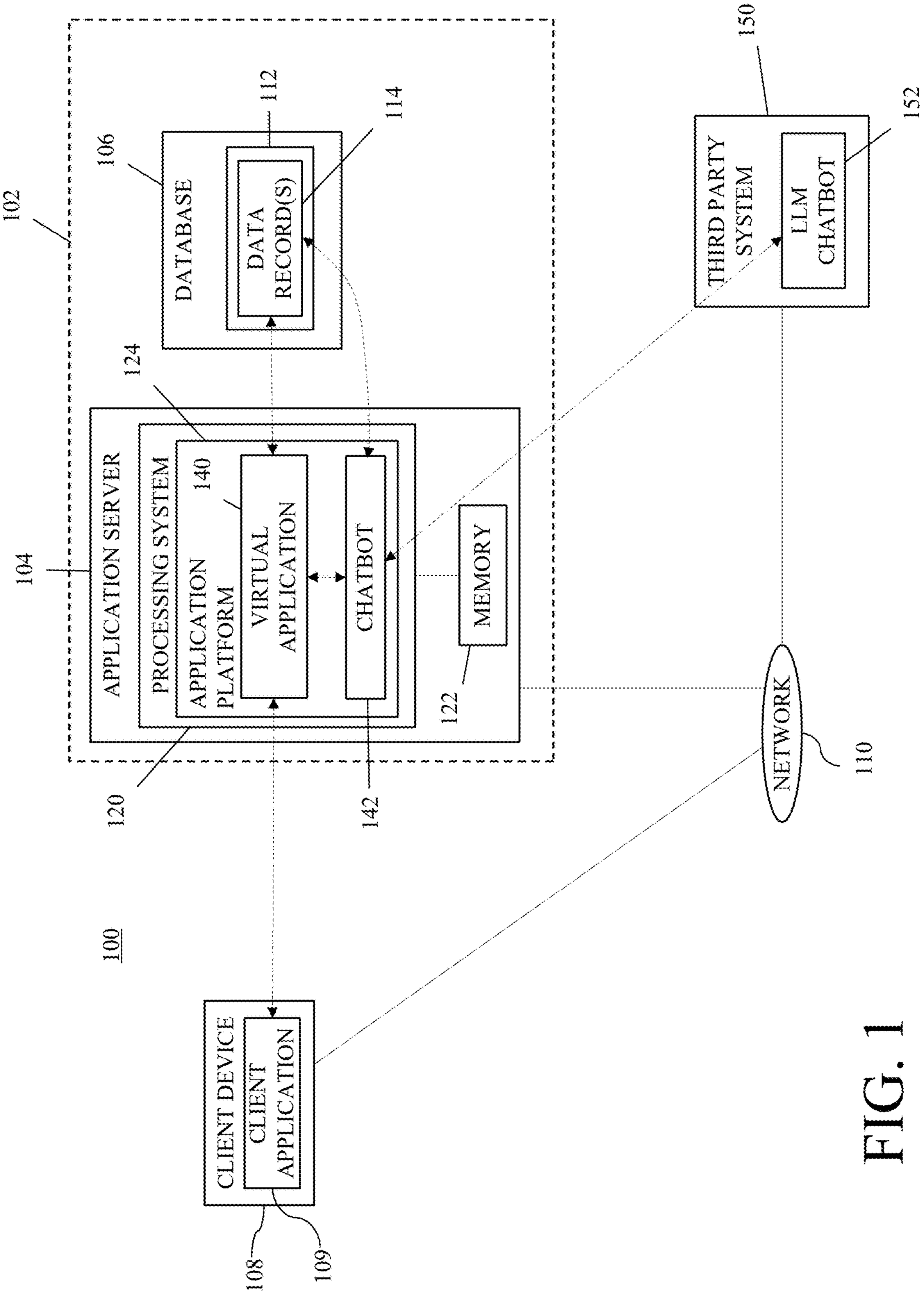
FIG. 1 is a block diagram depicting an exemplary computing system depicting an environment suitable for implementing aspects of the subject matter described herein in accordance with one or more implementations.

The subject matter described herein generally relates to computing systems and methods for customizing or personalizing interactions with a chatbot or other external artificial intelligence (AI) system or service to automatically generate automated responses to conversational user inputs in a customizable or personalized manner. As described in greater detail below, an intermediate service utilizes a personalized model or other personalized or custom data associated with the particular user interacting with a large language model-based chatbot, alternatively referred to herein as a personal model, to effectively ground the large language model (LLM) by providing additional knowledge or context associated with the particular user to enhance the response provided by the chatbot and better reflect the user's experience, knowledge, data or other information associated with the user that is not known or otherwise available to the chatbot. For example, the chatbot or other AI system or service may utilize one or more large language models or corresponding training data sets that are intended to be generic and lack various pieces of data or information contained in the user's personal model or other user-specific data, which, in turn, results in the chatbot providing a more superficial response to the user that may be suitable for a general audience or generic purpose but lacks the specificity, depth or comprehensiveness that may be desired by the user.

Rather than retraining the chatbot or other external AI system, the intermediate service utilizes the personal model to ground the LLM and provide additional user context to the chatbot or AI system in concert with a prompt, request or other input from a user to correspondingly adjust, augment or otherwise tailor the resulting response generated by the LLM-based chatbot in a manner that reflects the user context. The personal model and the intermediate service effectively extends the understanding of the chatbot or AI system by capturing and providing information that is pertinent to the user that represents the particular user context (e.g., the user's knowledge, education, experience, behavior and/or the like) to allow the chatbot to provide a response that is more specific or comprehensive and more personalized for the user, rather than providing generic responses devoid of any user context.

In one or more exemplary implementations, the conversational user inputs and responses described herein are unstructured and free form using natural language that is not constrained to any particular syntax or ordering of speakers or utterances thereby. In this regard, an utterance should be understood as a discrete uninterrupted chain of language provided by an individual conversation participant or actor or otherwise associated with a particular source of the content of the utterance, which could be a human user or speaker (e.g., a customer, a sales representative, a customer support representative, a live agent, and/or the like) or an automated actor or speaker (e.g., a chatbot or other automated system). For example, in a chat messaging or text messaging context, each separate and discrete message that originates from a particular actor that is part of the conversation constitutes an utterance associated with the conversation, where each utterance may precede and/or be followed by a subsequent utterance by the same actor or a different actor within the conversation. In this regard, the conversational user input that functions as the input prompt for which an automated response is to be generated may be constructed from one or more utterances by the same actor within a conversation, and is not necessarily limited to an individual message or utterance. Additionally, it should be noted that although the subject matter may be described herein in the context of conversations (e.g., chat logs, text message logs, call transcripts, comment threads, feeds and/or the like) for purposes of explanation, the subject matter described herein is not necessarily limited to conversations and may be implemented in an equivalent manner with respect to any particular type of database record or database object including text fields.

FIG. 1 depicts an exemplary depicts an exemplary computing system 100 including a database system 102 configurable to provide an application platform 124 capable of supporting conversational interactions with a user of a client device 108. In exemplary implementations, the database system 102 is capable of provisioning instances of one or more virtual applications 140 to client applications 109 at client devices 108 over a communications network 110 (e.g., the Internet or any sort or combination of wired and/or wireless computer network, a cellular network, a mobile broadband network, a radio network, or the like), where the virtual applications 140 invoke, include or otherwise incorporate a conversational interaction service 142 (or chatbot service) that is configurable to support conversational interactions and interface with an LLM-based chatbot service 152 (or LLM chatbot), as described in greater detail below. For purposes of explanation, the conversational interaction service 142 may alternatively be referred to herein as a chatbot service in the context of an exemplary implementation providing substantially real-time conversational interactions with an end user the context of a chat window associated with an instance of the virtual application 140, however, it should be appreciated that the subject matter described herein is not limited to chatbots and the conversational interaction service 142 may be configurable to support any number of different types or forms of conversational interactions in an automated manner (e.g., by automatically generating responsive emails, text messages, and/or the like). Accordingly, it should be appreciated that FIG. 1 is a simplified representation of a computing system 100 and is not intended to be limiting.

In one or more exemplary implementations, the database system 102 includes one or more application servers 104 that support an application platform 124 capable of providing instances of virtual web applications 140, over the network 110, to any number of client devices 108 that users may interact with to view, access or obtain data or other information from one or more data records 114 maintained in one or more data tables 112 at a database 106 or other repository associated with the database system 102. For example, a database 106 may maintain, on behalf of a user, tenant, organization or other resource owner, data records 114 entered or created by that resource owner (or users associated therewith), files, documents, objects or other records uploaded by the resource owner (or users associated therewith), and/or files, documents, objects or other records automatically generated by one or more computing processes (e.g., by the server 104 based on user input or other records or files stored in the database 106). In this regard, in one or more implementations, the database system 102 is realized as an on-demand multi-tenant database system that is capable of dynamically creating and supporting virtual web applications 140 based upon data from a common database 106 that is shared between multiple tenants, which may alternatively be referred to herein as a multi-tenant database. Data and services generated by the virtual web applications 140 may be provided via the network 110 to any number of client devices 108, as desired, where instances of the virtual web application 140 may be suitably generated at run-time (or on-demand) using a common application platform 124 that securely provides access to the data in the database 106 for each of the various tenants subscribing to the multi-tenant system. In one or more exemplary implementations, the virtual web application 140 is realized as a customer relationship management (CRM) application.

The application server 104 generally represents the one or more server computing devices, server computing systems or other combination of processing logic, circuitry, hardware, and/or other components configured to support remote access to data records 114 maintained in the data tables 112 at the database 106 via the network 110. Although not illustrated in FIG. 1, in practice, the database system 102 may include any number of application servers 104 in concert with a load balancer that manages the distribution of network traffic across different servers 104 of the database system 102.

In exemplary implementations, the application server 104 generally includes at least one processing system 120, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 104 may also include one or more communications interfaces, which include any number of transmitters, receiver, transceivers, wired network interface controllers (e.g., an Ethernet adapter), wireless adapters or another suitable network interface that supports communications to/from the network 110 coupled thereto. The application server 104 also includes or otherwise accesses a data storage element 122 (or memory), and depending on the implementation, the memory 122 may be realized as a random access memory (RAM), read only memory (ROM), flash memory, magnetic or optical mass storage, or any other suitable non-transitory short or long term data storage or other computer-readable media, and/or any suitable combination thereof. In exemplary implementations, the memory 122 stores code or other computer-executable programming instructions that, when executed by the processing system 120, are configurable to cause the processing system 120 to support or otherwise facilitate the application platform 124 and related software services that are configurable to subject matter described herein.

The client device 108 generally represents an electronic device coupled to the network 110 that may be utilized by a user to access an instance of the virtual web application 140 using an application 109 executing on or at the client device 108. In practice, the client device 108 can be realized as any sort of personal computer, mobile telephone, tablet or other network-enabled electronic device coupled to the network 110 that executes or otherwise supports a web browser or other client application 109 that allows a user to access one or more GUI displays provided by the virtual web application 140. In exemplary implementations, the client device 108 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 108. Some implementations may support text-to-speech, speech-to-text, or other speech recognition systems, in which case the client device 108 may include a microphone or other audio input device that functions as the user input device, with a speaker or other audio output device capable of functioning as an output device. The illustrated client device 108 executes or otherwise supports a client application 109 that communicates with the application platform 124 provided by the processing system 120 at the application server 104 to access an instance of the virtual web application 140 using a networking protocol. In some implementations, the client application 109 is realized as a web browser or similar local client application executed by the client device 108 that contacts the application platform 124 at the application server 104 using a networking protocol, such as the hypertext transport protocol secure (HTTPS). In this manner, in one or more implementations, the client application 109 may be utilized to access or otherwise initiate an instance of a virtual web application 140 hosted by the database system 102, where the virtual web application 140 provides one or more web page GUI displays within the client application 109 that include GUI elements for interfacing and/or interacting with records 114 maintained at the database 106.

In exemplary embodiments, the database 106 stores or otherwise maintains data for integration with or invocation by a virtual web application 140 in objects organized in object tables 112. In this regard, the database 106 may include any number of different object tables 112 configured to store or otherwise maintain alphanumeric values or other descriptive information that define a particular instance of a respective type of object associated with a respective object table 112. For example, the virtual application 140 may support a number of different types of objects that may be incorporated into or otherwise depicted or manipulated by the virtual application, with each different type of object having a corresponding object table 112 that includes columns or fields corresponding to the different parameters or criteria that define a particular instance of that object. For example, a virtual CRM application 140 may utilize standard objects such as "account" objects, "opportunity" objects, "contact" objects, or the like having respective objects tables 112 maintaining data records 114 for the respective object type, along with custom object types that may be specific to a particular tenant, individual user or other resource owner. In this regard, the data records 114 maintain values for various fields associated with that respective object type along with metadata or other information pertaining to the particular object type defining the structure (e.g., the formatting, functions and other constructs) of each respective object and the various fields associated therewith.

In some implementations, the database 106 stores or otherwise maintains application objects (e.g., an application object type) where the application object table 112 includes columns or fields corresponding to the different parameters or criteria that define a particular virtual web application 140 capable of being generated or otherwise provided by the application platform 124 on a client device 108. In this regard, the database 106 may also store or maintain graphical user interface (GUI) objects that may be associated with or referenced by a particular application object and include columns or fields that define the layout, sequencing, and other characteristics of GUI displays to be presented by the application platform 124 on a client device 108 in conjunction with that application 140.

In exemplary implementations, the database 106 stores or otherwise maintains additional database objects for association and/or integration with a virtual web application 140, which may include custom objects and/or standard objects. For example, an administrator user associated with a particular resource owner may utilize an instance of a virtual web application 140 to create or otherwise define a new custom field to be added to or associated with a standard object, or define a new custom object type that includes one or more new custom fields associated therewith. In this regard, the database 106 may also store or otherwise maintain metadata that defines or describes the fields, process flows, workflows, formulas, business logic, structure and other database components or constructs that may be associated with a particular application database object. In various implementations, the database 106 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables 112 (e.g., in response to creation, changes, or updates to a record in an object table 112).

Still referring to FIG. 1, in exemplary implementations, the code or other programming instructions associated with the application platform 124 and/or the virtual web applications 140 may be configurable to incorporate, invoke or otherwise include a chatbot service 142, which generally represents a software component capable of providing or otherwise supporting an automated agent or chatbot service capable of exchanging chat messages or providing other conversational responses, which may include text-based messages that include plain-text words only, and/or rich content messages that include graphical elements, enhanced formatting, interactive functionality, or the like. Depending on the implementation, the chatbot service 142 can be integrated with or otherwise incorporated as part of the virtual application 140, or be realized as a separate or standalone process, application programming interface (API), software agent, or the like that is capable of interacting with the client device 108 independent of the virtual application 140. In practice, the chatbot service 142 may incorporate or otherwise reference a vocabulary of words, phrases, phonemes, or the like associated with a particular language that supports conversational interaction with the user of the client device 108. For example, the vocabulary may be stored or otherwise maintained at the database system 102 (e.g., in the database 106 or memory 122) and utilized by the chatbot service 142 to provide speech recognition or otherwise parse and resolve text or other conversational input received via a graphical user interface (GUI) or chat window associated with the chatbot service 142, as well as to generate or otherwise provide conversational output (e.g., text, audio, or the like) to the client device 108 for presentation to the user (e.g., in response to received conversational input).

In exemplary implementations, the chatbot service 142 receives or otherwise obtains a conversational input from a user of the client device 108 (e.g., via client application 107 and network 110) and parses the conversational input using the conversational vocabulary associated with the chatbot service 142 to identify or otherwise discern an intent of the user or another action that the user would like to perform and automatically respond in a corresponding manner, including by updating the chat window or other GUI display associated with the conversation with the chatbot service 142 to include a graphical representation of a conversational response generated by the chatbot service 142 responsive to the conversational user input prompt received from the user. In this manner, a user of a client device 108 interacts or otherwise communicates with the chatbot service 142 via an associated GUI display within the client application 109 (e.g., a chat window) to transmit or otherwise provide conversational user input in the context of a conversation with the chatbot service 142. Depending on the implementation, the conversational input may be received by the user selecting or otherwise activating a GUI element presented within the chat window, or the user may input (e.g., via typing, swiping, touch, voice, or any other suitable method) a conversational string of words in a free-form or unconstrained manner, which is captured by a user input device of the client device 108 and provided over the network 110 to the application platform 124 and/or the chatbot service 142 via the client application 109. The chatbot service 142 then parses or otherwise analyzes the conversational input using natural language processing (NLP) to identify the intent or other action desired by the user based on the content, syntax, structure and/or other linguistic characteristics of the conversational input.

In one or more implementations, when the chatbot service 142 determines it is unable to ascertain the intent of a received conversational user input or is otherwise unable to respond to the received conversational user input based on the vocabulary and/or other data that is accessible to or otherwise associated with the chatbot service 142, the chatbot service 142 analyzes the received conversational user input to determine whether or not to forward the received conversational user input as an input prompt to a LLM-based chatbot service 152 for generating a corresponding LLM-based automated conversational response to the received conversational user input. In this regard, the LLM-based chatbot service 152 may be realized as an application programming interface (API), software agent, or the like that is capable of receiving a textual input prompt and providing a corresponding natural language textual response to the received input prompt using a LLM and corresponding artificial intelligence or machine learning techniques such that the natural language textual response represents a logical and coherent response to the textual input prompt. In practice, the LLM chatbot 152 may utilize NLP or other linguistic analytic techniques to analyze a received conversational input prompt and automatically generate a conversational response to the received conversational input prompt using neural networks or other AI techniques based on generative pre-trained transformers (GPTs) or other LLMs, the details of which are not germane to this disclosure.

In one or more exemplary implementations, the LLM-based chatbot service 152 is hosted or otherwise implemented at an external computing system 150 on the network 110. The external computing system 150 generally includes at least one server communicatively coupled to the network 110 to support access to the LLM-based chatbot service 152. In this regard, in some implementations, the external computing system 150 is physically and logically distinct from the database system 102 and/or the application platform 124. For example, the external computing system 150 may be owned, controlled, or otherwise operated by a third party different from the parties that own, control and/or operate the database system 102 and/or the application platform 124. That said, in other implementations, the external computing system 150 may be affiliated with the same party that owns, controls and/or operates the database system 102 and/or the application platform 124.

In exemplary embodiments, the virtual web application 140 provided by the application platform 124 includes or otherwise supports chat messaging, text messaging, instant messaging or a similar feature where users communicate or otherwise interact with one another or another system (e.g., external system 150) in the context of a conversation using the web application 140. In practice, the application server 104 and/or the web application 140 at the application platform 124 may store or otherwise maintain conversation data for a conversation in a database. For example, the conversation data may include a transcript for each conversation existing within instances of the web application 140 at the application platform 124 that maintains the sequence of utterances associated with the conversation and the respective speaker or source of each respective utterance of the conversation. The conversation data for a given conversation may also include user identifiers or other information identifying the participants associated with the conversation and other metadata associated with the conversation, such as, for example, whether or not the conversation is a group conversation, whether or not the group conversation is public or private, and the like. For example, some implementations of the web application 140 may support public channels, private channels, one-to-one direct messages and group messages.

In exemplary implementations, a user of the client device 108 may interact with the web application 140 provided by the application platform 124 to initiate or otherwise invoke one or more services, such as chatbot service 142, to initiate a conversation or other user interaction with the LLM chatbot 152 and/or third party system 150 external to the application platform 124. In this regard, the chatbot service 142 may include, incorporate, or otherwise be realized as an application programming interface (API), software agent, or the like that is capable of interacting with the LLM chatbot 152 and/or third party system 150. For example, a GUI display associated with the web application 140 provided by the application platform 124 may include a GUI element that is manipulable by a user to input or otherwise provide indicia of the LLM chatbot 152 and/or third party system 150 that the user would like to engage or interact with within the context of a conversation depicted within the GUI display.

As described in greater detail below, in exemplary implementations, the application platform 124 and/or the chatbot service 142 includes or otherwise incorporates a contextual personalization service configurable to develop and maintain one or more models or other digital representations associated with a particular individual user that are personalized or customized to reflect that particular individual user to be maintained at the database system 102, for example, based on one or more data records 114 in the database 106 that are associated with the particular user. Thereafter, the chatbot service 142 may utilize a personal model associated with the particular user to ground an input prompt provided to the LLM chatbot 152 by adding context to or otherwise customizing interactions between that particular individual user at a client device 108 and the third party system 150. In this regard, the chatbot service 142 utilizes identifiers associated with the user of the client device 108 participating in the conversation with the chatbot service 142 at the application platform 124 to identify the particular model(s), digital representation(s) or other data associated with that particular individual user in the database 106 to be utilized to provide additional context or information to the third party system 150 in connection with the conversational user interactions with the LLM chatbot 152 in accordance with the permissions associated with that user at the database system 102. For example, based on the various permissions associated with the various data records 114 (e.g., the objects, files, documents or other pieces of data or information) associated with the user at the database system 102, the chatbot service 142 at the database system 102 may identify what model(s), digital representation(s) or other data associated with the user can be shared with the LLM chatbot 152 and/or third party system 150.

Still referring to FIG. 1, in exemplary implementations, a user interacts with the chatbot service 142 at the application platform 124 to initiate a communications session with the LLM chatbot 152 and/or third party system 150 and then inputs or otherwise provides a conversational user input. A contextual personalization component of the chatbot service 142 utilizes the received conversational user input along with one or more identifiers associated with the user to access the database 106 to retrieve or otherwise obtain one or more models or digital representations associated with the user to identify additional contextual data from the database 106 that is related to the received conversational user input to be provided to the LLM chatbot 152 and/or third party system 150. The contextual personalization component of the chatbot service 142 augments the received conversational user input with the additional contextual data to provide an input prompt that is grounded in a personalized or customized manner. In this regard, the chatbot service 142 automatically generates a personalized or customized augmented conversational input prompt that includes, incorporates or otherwise reflects the additional relevant contextual data identified by the contextual personalization component that is specific to the particular individual user providing the initial conversational user input along with the content of the initial conversational user input. In this regard, in some implementations, the contextual personalization component of the chatbot service 142 may generate the augmented conversational input prompt with a syntactical structure that conveys or otherwise delineates the added contextual data from the syntax and/or semantics of the underlying conversational user input received from the user of the client device 108.

The LLM chatbot 152 automatically parses or analyzes the contextual data provided as part of the augmented conversational user input prompt in concert with generating a conversational response to the semantic and/or syntactic content of the initial conversational user input using the pretrained GPTs, LLMs, or other algorithms or configurations associated with the LLM chatbot 152 and/or third party system 150. In this regard, rather than the LLM chatbot 152 and/or third party system 150 retraining or regenerating the GPTs, LLMs, neural networks and/or the like associated with the LLM chatbot 152 and/or third party system 150, the LLM chatbot 152 and/or third party system 150 is configurable to apply the existing GPTs, LLMs, or other algorithms or configurations to the personalized contextual data before and/or after applying the existing GPTs, LLMs, or other algorithms or configurations to the initial conversational user input, such that the autogenerated conversational response to the semantic and/or syntactic content of the initial conversational user input reflects the additional knowledge or context specific to the individual end user that is gleaned from the added contextual data. As a result, the autogenerated conversational response to the received conversational user input is customized or personalized to reflect the individual user providing the initial conversational user input based on that user's individual personalization model(s) or other contextual data provided by the contextual personalization service at the database system 102 based on that individual user's data maintained in the database 106. In this regard, the customized autogenerated conversational response differs from the conversational response that would otherwise be generated by the LLM chatbot 152 and/or third party system 150 applying the existing GPTs, LLMs, or other algorithms or configurations to the initial conversational user input without the personalized contextual data. For example, the customized autogenerated conversational response may be more comprehensive or reflect knowledge gleaned from the user's contextual data that would not otherwise be available using the pretrained GPTs, LLMs, or other algorithms or configurations associated with the LLM chatbot 152 and/or third party system 150.

The chatbot service 142 at the database system 102 receives the customized autogenerated conversational response and transmits or otherwise provides a corresponding conversational response to the virtual application 140 and/or the application platform 124 to be rendered, displayed or otherwise generated within the context of the conversation with the LLM chatbot 152 and/or third party system 150 within the GUI display associated with the web application 140 provided by the application platform 124. In some implementations, the chatbot service 142 at the database system 102 may retransmit the customized autogenerated conversational response from the LLM chatbot 152 without modification. That said, in other implementations, the chatbot service 142 may utilize one or more models, digital representations or other data or information associated with the user to further modify or augment the customized autogenerated conversational response before providing an augmented customized conversational response to the user. For example, based on the individual's unique models and/or data maintained in the database 106, the chatbot service 142 at the database system 102 may modify the semantic content and/or the syntactic structure of the customized autogenerated conversational response to better suit the individual user, for example, by eliminating textual content that the individual user is likely to consider extraneous or superfluous given the individual user's experience or knowledge derivable from the individual user's data maintained in the database 106, reformatting or rewording the customized autogenerated conversational response to better reflect the individual user's education level, vocabulary, diction, conversational preferences, etc.

By virtue of the contextual personalization provided by the chatbot service 142 at the database system 102, the conversational response received at the application platform 124 better suits the needs or desires of the individual user providing the initial conversational input by accounting for the user's individual background knowledge, experience and/or other preferences relative to a generic conversational response that would otherwise be generated by the LLM chatbot 152 and/or third party system 150 responsive to the initial conversational input absent any contextual data or other personalization.

Figure 2:
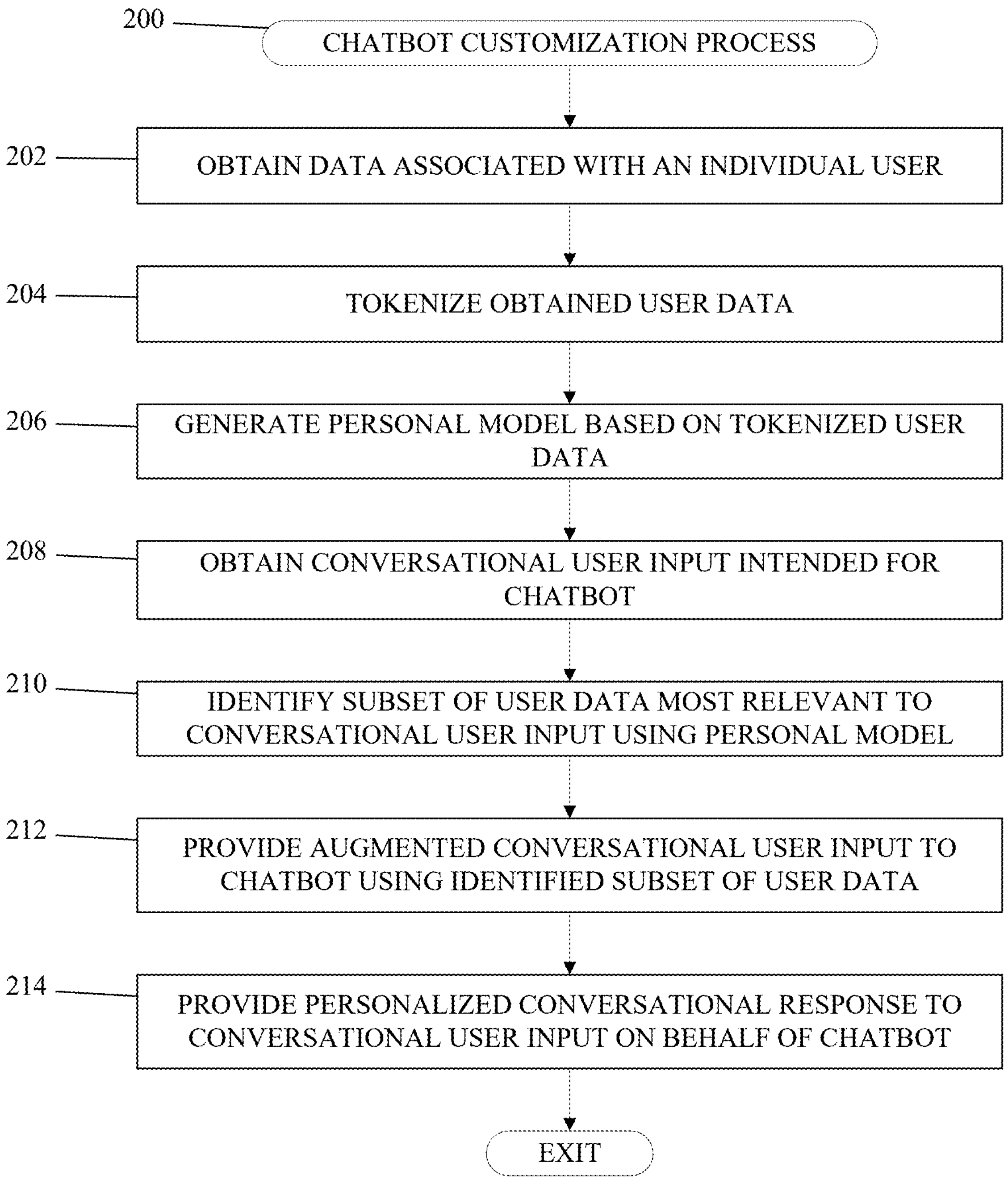
FIG. 2 is a flow diagram illustrating a chatbot customization process suitable for implementation in connection with the computing system of FIG. 1 in accordance with one or more exemplary implementations.

FIG. 2 depicts an exemplary chatbot customization process 200 that may be implemented or otherwise performed to receive personalized or customized autogenerated conversational responses from a chatbot or other AI system and perform additional tasks, functions, and/or operations described herein. In one or more implementations, the chatbot customization process 200 is implemented or otherwise performed by the chatbot service 142 or another service associated with the virtual application 140 at the application platform 124 that provides personalization or customization models as service (e.g., models as a service (MaaS)) between a client-side system (e.g., client device 108) and a LLM chatbot 152 or other destination AI system responsible for generating a conversational response. For illustrative purposes, the following description may refer to elements mentioned above in connection with FIG. 1. It should be appreciated that the chatbot customization process 200 may include any number of additional or alternative tasks, the tasks need not be performed in the illustrated order and/or the tasks may be performed concurrently, and/or the chatbot customization process 200 may be incorporated into a more comprehensive procedure or process having additional functionality not described in detail herein. Moreover, one or more of the tasks shown and described in the context of FIG. 2 could be omitted from a practical implementation of the chatbot customization process 200 as long as the intended overall functionality remains intact.

Referring to FIG. 2, with continued reference to FIG. 1, the illustrated chatbot customization process 200 initializes or otherwise begins by receiving or otherwise obtaining user data associated with a particular individual user for modeling, tokenizing the user data associated with that particular individual user and then generating or otherwise determining one or more personal models associated with that individual user based on the user's tokenized data (tasks 202, 204, 206). For example, an individual user may interact with a contextual personalization service at the database system 102, via the virtual application 140 or another interface associated with the contextual personalization service provided by the application platform 124, to select, indicate, upload or otherwise identify pieces of data or information associated with the particular user that the user would like the contextual personalization service at the database system 102 to be able to utilize or employ when interacting with a chatbot associated with the LLM chatbot 152 and/or third party system 150. In this regard, the user may select, identify or otherwise control which files, documents, objects or other data records 114 maintained on behalf of the user or the user's tenant, organization or other resource owner that the user would like to be utilized or otherwise incorporated into the personal model(s) for the user created and/or maintained by the contextual personalization service. For example, a user may enable his or her emails, chat logs, or other conversation data maintained in the database 106 to be ingested, incorporated or otherwise retrieved by the contextual personalization service at the application platform 124 to enable the contextual personalization service at the database system 102 to incorporate the user's prior conversation data. In some implementations, the user may upload files to the contextual personalization service at the database system 102 (e.g., via one or more APIs or other services) or otherwise interact with the client device 108 to enable sharing or retrieval of data from the client device 108 to the contextual personalization service at the database system 102. In this regard, it should be appreciated that the subject matter described herein is not limited to any particular type or amount of user data that may be maintained at the database 106 for use by the contextual personalization service at the database system 102.

In addition to providing one or more user interfaces that allow the user to identify the user's personal data that he or she would like to be incorporated into any personal model(s) created and/or maintained by the contextual personalization service for the user, in practice, the contextual personalization service may also provide one or more user interfaces (or user interface elements) to identify personal data that he or she would like to be excluded from any personal model(s). For example, the contextual personalization service may provide a GUI display that includes GUI elements manipulable by the user to identify particular types of database objects or records 114 that the user would like to be included in any personal model, and similarly, identify other types of database objects or records 114 that the user would like to exclude from modeling.

After identifying or obtaining a set of user data to be utilized for modeling, the contextual personalization service at the database system 102 tokenizes the individual pieces of user data and then generates a corresponding personal model for the user that numerically or mathematically represents the set of user data based on the tokenized user data. For example, the textual content of a particular file, document, record, transcript, database object or other piece of data associated with the individual user at the database system 102 may be input to an encoder model or other word embedding algorithm to generate a corresponding vector or numerical representation of the textual content. In this regard, in some implementations, the textual content of the particular piece of user data may be lemmatized, normalized, and/or divided into smaller segments prior to tokenization or embedding to improve the relationship between the numerical representation of the respective piece of user data and the semantic and/or syntactic content of that respective piece of user data. The resulting personal model for the individual user may be realized as a bag-of-words model or another suitable model including one or more matrices that captures the different numerical or vector representations of the different pieces of user data associated with the user.

After generating a personal model for a particular user, the chatbot customization process 200 continues by receiving or otherwise obtaining a conversational user input associated with that particular user, selecting or otherwise identifying a subset of user data most relevant to the received conversational user input using the personal model, and providing an augmented conversational user input to the chatbot using the identified subset of user data (tasks 208, 210, 212). For example, in response to receiving a conversional user input at the application platform 124, the contextual personalization service at the database system 102 performs the same techniques utilized to generate the numerical representations of that user's data (e.g., tokenization, lemmatization, normalization and/or encoding) to generate a corresponding numerical representation or vector word embedding of the received conversational user input. After generating a numerical representation of the received conversational user input, the contextual personalization service at the database system 102 utilizes the user's personal model to identify a subset of the user's data that is most relevant to the received conversational user input. For example, the contextual personalization service at the database system 102 may utilize cosine similarity, Euclidean distance, or other mathematical techniques to identify which vectors or matrices of the user's personal bag-of-words model are closest to the numerical vector representation of the received conversational user input.

After identifying the subset of user data closest to the received conversational user input using the model, the contextual personalization service at the database system 102 selects or otherwise obtains the textual content of the closest pieces of user data for use in grounding or otherwise providing additional personalized context associated with the conversational user input to the LLM chatbot 152 and/or third party system 150. In some implementations, the contextual personalization service at the database system 102 may select a fixed number of pieces of user data (e.g., the ten closest pieces of user data) for augmenting the conversational user input, while in other implementations, the contextual personalization service at the database system 102 may select or otherwise obtain textual content from the closest pieces of user data until the cumulative amount of words or characters obtained by the contextual personalization service at the database system 102 reaches a maximum threshold number of words or characters supported for input to the LLM chatbot 152 and/or third party system 150. For example, in implementations where the LLM chatbot 152 and/or third party system 150 supports a maximum number of characters to be input to a chatbot, the contextual personalization service at the database system 102 may select or otherwise obtain additional supplemental textual content from the closest pieces of user data until the total number of characters between the conversational user input and the retrieved textual content from the user data is equal to the maximum number of characters supported by the LLM chatbot 152.

After obtaining the desired amount of supplemental textual content from the user data for augmenting the conversational user input, the contextual personalization service at the database system 102 automatically generates an augmented conversational user input prompt by combining, summarizing or otherwise amalgamating the user's supplemental textual content with the textual content of the conversational user input in a manner that preserves the semantic and/or syntactic nature of the conversational user input while conveying the user's supplemental textual content as related information, knowledge or context associated with the conversational user input. In this regard, the augmented conversational user input prompt generated by the contextual personalization service at the database system 102 may be structured or formatted such that the chatbot at the LLM chatbot 152 and/or third party system 150 ingests or interprets the user's textual content as relevant to the conversational user input while generating a conversational response to the conversational user input. As a result, the chatbot at the LLM chatbot 152 and/or third party system 150 automatically generates a personalized conversational response that is responsive to the conversational user input but accounts for or otherwise reflects the user's supplemental textual content.

The chatbot customization process 200 continues by transmitting or otherwise providing the personalized conversational response to the received conversational user input for presentation to the user on behalf of the chatbot (task 214). In this regard, the chatbot service 142 at the database system 102 receives the autogenerated personalized conversational response provided by the LLM chatbot 152 and/or third party system 150 and provides a corresponding conversational response to the application platform 124 and/or virtual application 140 for rendering or displaying the conversational response to the received conversational user input within the context of the conversation depicted on or within the GUI display associated with the virtual application 140 and/or chatbot service 142 at the client device 108. In some implementations, a contextual personalization component of the chatbot service 142 at the database system 102 may modify, alter or otherwise augment the personalized conversational response to generate an augmented personalized conversational response to be provided within the context of the virtual application 140 provided by the application platform 124 that reflects the individual's user data or other models or digital representations of the user maintained in the database 106 at the database system 102. For example, depending on the particular user's education level, experience, job title, employer, industry, and/or the like, a contextual personalization service at the database system 102 may augment, tailor or otherwise fine tune the autogenerated personalized conversational response provided by the LLM chatbot 152 to utilize vocabulary or syntax that is specific to the particular individual user's characteristics or preferences, which are not known or unavailable to the LLM chatbot 152 and/or third party system 150. Similarly, the contextual personalization service at the database system 102 may remove textual content from the autogenerated personalized conversational response that is extraneous, superfluous or otherwise irrelevant to the particular individual submitting the conversational user input based on that individual user's data maintained in the database 106 at the database system 102. In this manner, the resulting augmented personalized conversational response that is generated by the chatbot service 142 at the application platform 124 reflects the individual user's available data along with the user's background knowledge, experience, and other personal preferences or idiosyncrasies that are not known or available to the LLM chatbot 152 and/or third party system 150, thereby improving the user experience and usefulness of the conversational response to the conversational user input.

Figure 3:
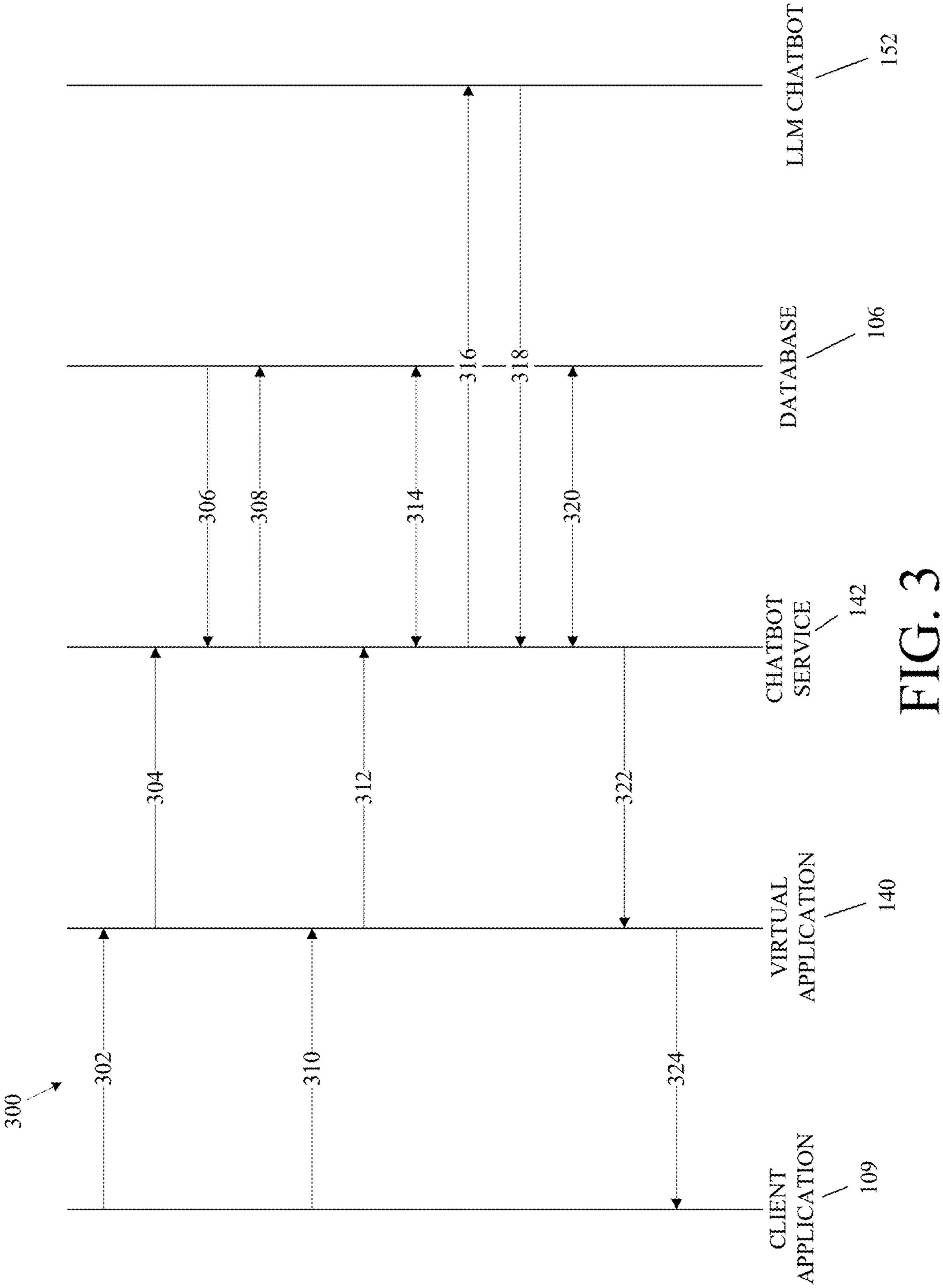
FIG. 3 is a timing diagram depicting an exemplary sequence of communications in the computing system of FIG. 1 in connection with the chatbot customization process in accordance with one or more exemplary implementations.

FIG. 3 depicts an exemplary sequence 300 of communications within the computing system 100 of FIG. 1 in connection with an exemplary implementation of the chatbot customization process 200 of FIG. 2. As described above, prior to interacting with the LLM chatbot 152, a user of a client application 109 at the client device 108 may interact with one or more GUI displays provided by the virtual application 140 to input or otherwise provide 302, to the application platform 124 over the network 110, that user's personal configuration information or settings for the personal model(s) to be created and maintained on behalf of that user, for example, by identifying the particular files, documents, objects or other records 114 in the database 106 that the user would like to be reflected in his or her personal model(s) and/or which files, documents, objects or other records 114 in the database 106 that the user would like to be excluded from his or her personal model(s). The virtual application 140 receives the personal model configuration information from the user and inputs or otherwise provides 304 the personal model configuration information to contextual personalization component of the chatbot service 142. The contextual personalization component of the chatbot service 142 retrieves or otherwise obtains 306, from the database 106, the textual content of the particular files, documents, transcripts, database objects or other data records 114 and tokenizes, encodes or otherwise processes the textual content of the selected subset of data records 114 to generate the user-specific personalized model and then writes or otherwise stores 308 the user's resulting personal model in the database 106 for subsequent retrieval.

After generating the personal model for the particular user, the user subsequently interacts with a GUI display of the virtual application 140 to interact with the virtual application 140 and/or the chatbot service 142 to input or otherwise provide 310 a conversational user input to the application platform 124 over the network 110. The virtual application 140 provides 312 the conversational user input to the chatbot service 142 to invoke or otherwise initial the contextual personalization service provided by the chatbot service 142. As described above, in response to receiving 312 the conversional user input, the chatbot service 142 performs the same techniques utilized to generate the personal model (e.g., tokenization, lemmatization, normalization and/or encoding) to generate a corresponding numerical representation or vector word embedding of the received conversational user input. After generating a numerical representation of the received conversational user input, the chatbot service 142 searches, queries or otherwise utilizes 314 the user's personal model in the database 106 identify a subset of the user's data records 114 that are most relevant to the received conversational user input (e.g., using cosine similarity, Euclidean distance, or other mathematical techniques) and then selects, retrieves or otherwise obtains the textual content of the closest data record(s) 114 for supplementing the received conversational user input.

After obtaining the desired amount of supplemental textual content from the user's data records 114 for augmenting the conversational user input, the chatbot service 142 automatically generates an augmented conversational user input prompt incorporating the textual content of the received conversational user input with the textual content derived from the user's data records 114 and then transmits or otherwise provides 316 the augmented conversational user input prompt to the LLM chatbot 152 at the third party system 150 over the network 110. As described above, the augmented conversational user input prompt may be structured or formatted such that the supplemental textual content from the user's data records 114 is ingested or interpreted by the LLM chatbot 152 as grounding information or other contextual information that is specific to the particular user and relevant to the associated textual content of the received conversational user input. In response, the LLM chatbot 152 automatically generates a personalized conversational response to the textual content of the conversational user input that also accounts for or otherwise reflects the user's supplemental textual content that was input to the LLM chatbot 152 as grounding information or otherwise for grounding purposes. The LLM chatbot 152 then automatically transmits or otherwise provides 318 the autogenerated conversational response back to the chatbot service 142 responsive to the augmented conversational user input prompt.

As described above, in one or more implementations, after receiving the autogenerated conversational response from the LLM chatbot 152, the contextual personalization component of the chatbot service 142 may apply an additional layer of personalization by further augmenting or modifying the autogenerated personalized conversational response from the LLM chatbot 152 in a manner that reflects the particular user's data records 114 and/or personal model(s) maintained in the database 106. For example, the chatbot service 142 may subsequently query 320 the database 1060 for information indicative of the particular user's education level, experience, job title, employer, industry, and/or the like to further augment, tailor or otherwise fine tune the autogenerated personalized conversational response provided by the LLM chatbot 152 to utilize vocabulary or syntax that is specific to the particular individual user's characteristics or preferences, which are not known or unavailable to the LLM chatbot 152 and/or third party system 150 (e.g., by removing textual content that is extraneous, superfluous or otherwise irrelevant, etc.). Thereafter, the chatbot service 142 provides 322 the resulting augmented personalized conversational response to the virtual application 140 at the application platform 124 for transmitting or otherwise providing 324 the personalized conversational response to the received conversational user input back to the client application 109 for presentation to the user on behalf of the chatbot service 142 within a GUI display at the client application 109. For example, in exemplary implementations, the virtual application 140 may dynamically update a graphical representation of a conversation depicted within a chat window or other GUI associated with the virtual application 140 to include a graphical representation of the textual content of the personalized conversational response as an utterance on behalf of the chatbot service 142 that is responsive to or otherwise follows the one or more utterances associated with the user that contain the conversational user input that formed the basis of the augmented conversational user input prompt that the personalized conversational response is responsive to. In this manner, the user of the client device 108 may perceive the received conversational response as having emanated from the chatbot service 142 and/or the LLM chatbot 152.

Figure 4:
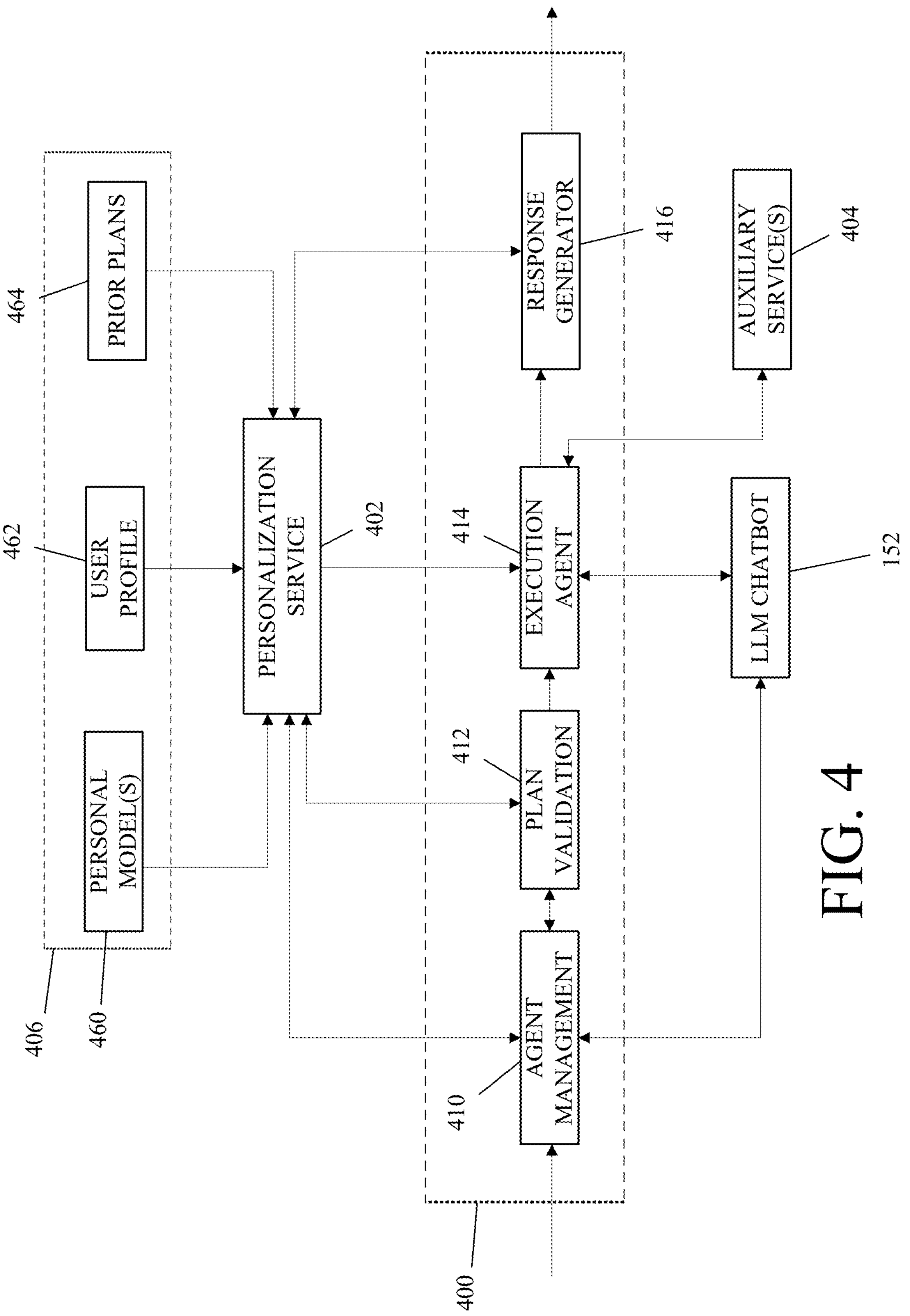
FIG. 4 is a schematic block diagram of an exemplary personalization agent service suitable for implementation at a database system in the computing system of FIG. 1 in accordance with one or more implementations.
Figure 5:
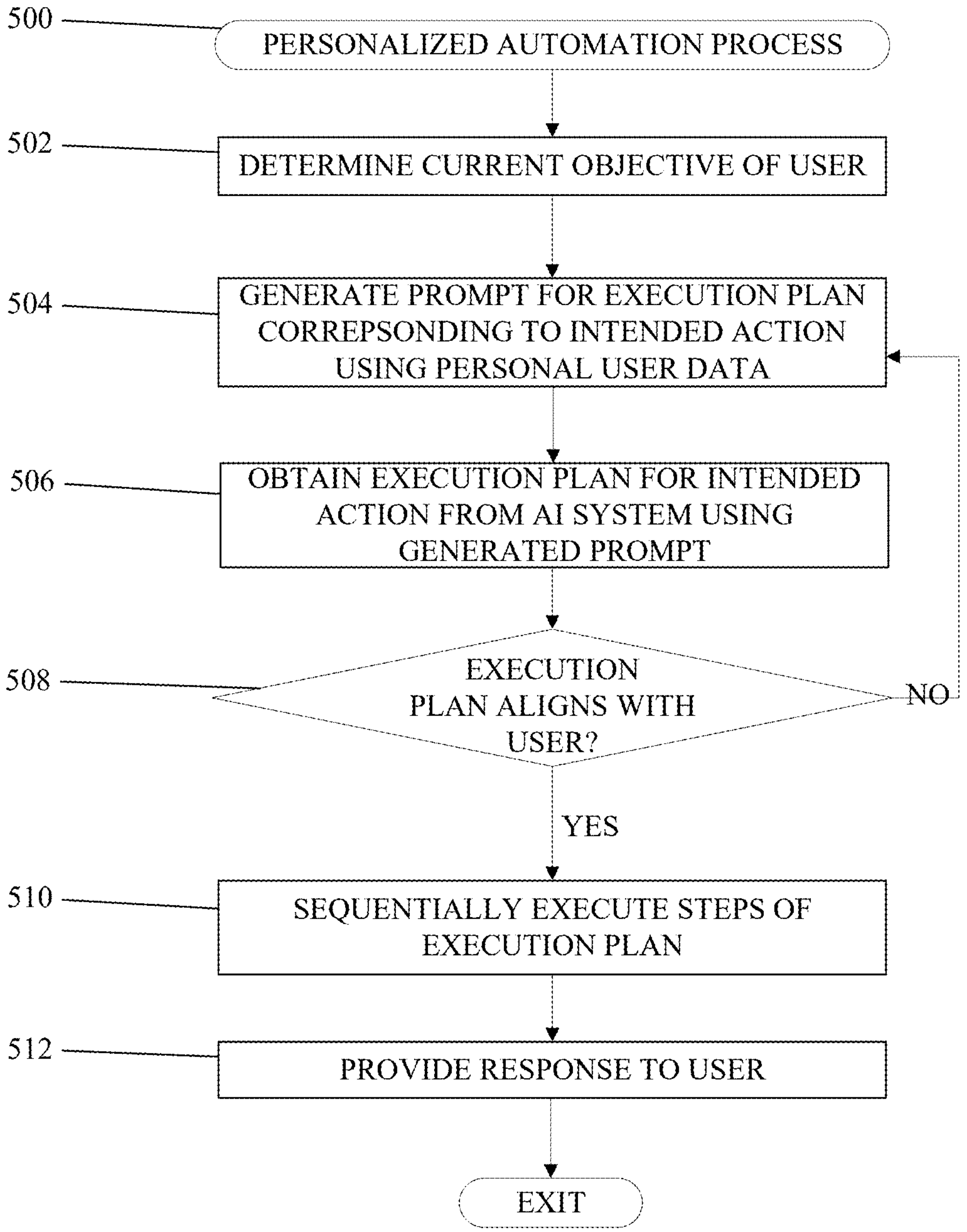
FIG. 5 is a flow diagram illustrating a personalized automation process suitable for implementation by the personalization agent service of FIG. 4 in the computing system of FIG. 1 in accordance with one or more exemplary implementations.
Figure 6:
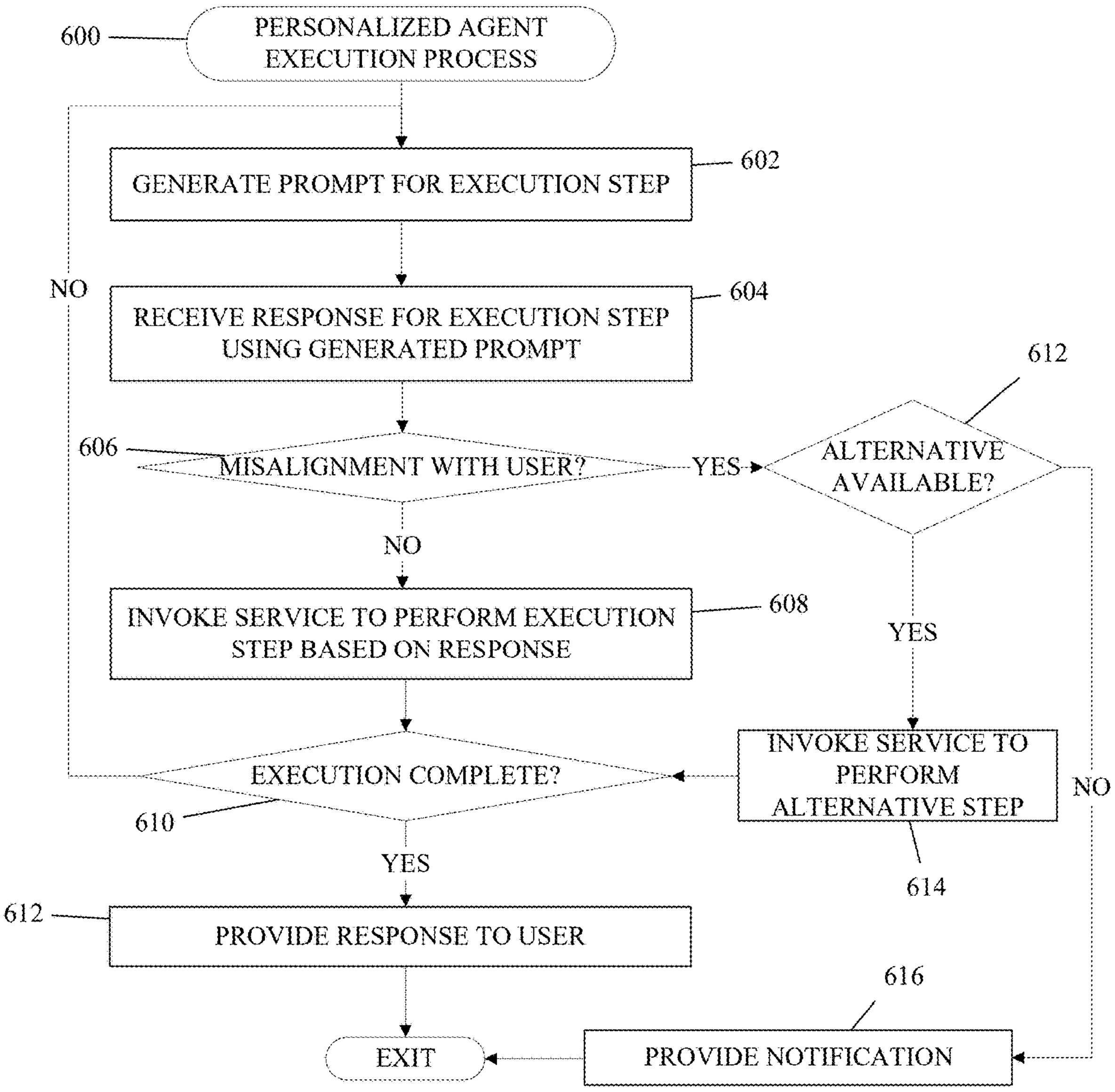
FIG. 6 is a flow diagram illustrating a personalized agent execution process suitable for implementation by the personalization agent service of FIG. 4 in the computing system of FIG. 1 in accordance with one or more exemplary implementations.

Referring now to FIGS. 4-6, in one or more exemplary implementations, the database system 102 is configurable to support a personalization agent service 400 capable of automatically and autonomously performing actions on behalf of a particular individual user or other entity associated with a personalized or customized model maintained at the database system 102. In this regard, in exemplary implementations, the personalization agent service 400 is invoked, executed or otherwise implemented by the application platform 124 at the application server 104 to perform one or more actions with respect to data records 114 in the database 106 in connection with an instance of the virtual application 140. For example, in the context of a CRM application 140, the personalization agent service 400 may automatically and autonomously perform actions such as automatically generating and sending emails relating to a particular account, opportunity, contact and/or the like, automatically generating and providing conversational responses within the context of a conversation (e.g., a personalized chatbot), automatically placing orders and generating corresponding order records and/or invoice in the database 106, automatically executing contracts, agreements or otherwise electronically signing documents, and/or the like.

FIG. 4 depicts an exemplary implementation of a personalization agent service 400 that may be integrated with, incorporated into, invoked by or otherwise implemented by one or more of the application platform 124, the virtual application 140 and/or the chatbot service 142 in connection with a contextual personalization service 402. The personalization agent service 400 analyzes textual content of a conversational user input or other data records 114 associated with a particular user to identify or otherwise determine a user objective or intent to perform a particular action in consultation with the contextual personalization service 402, and then automatically generates a corresponding plan or sequence of one or more sub-actions to be performed using the LLM chatbot service 152 and/or other auxiliary services 404 to autonomously perform or otherwise automatically achieve that action corresponding to the user objective or intent. In this regard, the depicted components generally represent the configured software components or subprocesses associated with the personalization agent service 400 that may be stored or otherwise maintained as code or other executable programming instructions that are executed by a processing system (e.g., processing system 120) in concert with generating the application platform 124 and/or the chatbot service 142 associated with a virtual web application 140. In a similar manner, the contextual personalization service 402 generally represents the configured software component that is stored or otherwise maintained as code or other executable programming instructions that are executed by the processing system 120 and/or the application server 104 in connection with providing the application platform 124 and/or the chatbot service 142 as described above in the context of FIG. 1-3 to generate one or more personal models 460 and support various personalizations and/or customizations based on user data 406 maintained in the database 106.

Still referring to FIG. 4, in exemplary implementations, the personalization agent service 400 includes an agent management component 410 (or service) that is configurable to receive input text data or other textual content associated with the particular user and then parses or otherwise analyzes the textual content using natural language processing (NLP) to identify the intent or other action desired by the user based on the content, syntax, structure and/or other linguistic characteristics of the textual content. In exemplary implementations, the agent management component 410 receives or otherwise obtains a conversational user input from the user of the client device 108 via a conversational interaction with the chatbot service 142 and then analyzes the text of the conversational user input. That said, in other implementations, the personalization agent service 400 may be automatically triggered by the occurrence of a particular event or action with respect to the database system 102, such as a create, read, update, or delete (CRUD) operation with respect to a particular data record 114, which, in turn causes the agent management component 410 to receive or otherwise obtain and analyze the textual content from one or more fields of a data record 114 associated with the user to identify a desired action to be performed based on an event associated with that data record 114.

In exemplary implementations, after identifying an intended action to be automatically performed by the personalization agent service 400, the agent management component 410 invokes or otherwise interacts with the contextual personalization service 402 to determine a plan or sequence for performing the intended action using the user data 406 associated with that particular user using the LLM chatbot service 152. In this regard, after determining the intended action to be performed, the agent management component 410 queries or otherwise interacts with the contextual personalization service 402 to retrieve or otherwise obtain user data 406 to be utilized to ground, supplement or otherwise augment an input prompt to be provided to the LLM chatbot service 152 to obtain a new plan for performing the intended action. For example, in a similar manner as described above, the agent management component 410 may interact with the contextual personalization service 402 to utilize the user's personal model 460 maintained in the database 106 to identify a subset of the user's data records 114 that are most relevant to the received conversational user input and obtain the textual content from the data record(s) 114 for supplementing the received conversational user input. Additionally, the agent management component 410 may interact with the contextual personalization service 402 to retrieve or otherwise obtain textual content characterizing a prior plan 464 that was previously utilized by the personalization agent service 400 to perform a same or similar action (e.g., based on cosine similarity, Euclidean distance, or other similarity between the intended action and a prior action associated with a prior plan 464).

After obtaining a relevant subset of user data 406 pertaining to the intended action, the agent management component 410 automatically generates an input prompt for the LLM chatbot service 152 requesting the LLM chatbot service 152 formulate or otherwise provide a plan for performing the intended action using the supplemental textual content from the user's data records 114 and/or prior plans 464 for the user. In this manner, the agent management component 410 grounds an input prompt asking how to perform the intended action with information specific to the particular user to tailor the resulting response provided by the LLM chatbot service 152 in a user-specific manner. The agent management component 410 transmits or otherwise provides the personalized augmented input prompt for how to perform the intended action to the LLM chatbot service 152, which, in turn, automatically generates a conversational response comprising a new autogenerated plan for performing the intended action based on the personalized augmented input prompt using the supplemental textual content obtained from the user data 406 maintained in the database 106. In this regard, the autogenerated plan provided by the LLM chatbot service 152 may include a sequence of steps (or sub-actions) to be performed using the LLM chatbot service 152 and/or other auxiliary services 404 to obtain a result that corresponds to performance of the intended action. For example, when the intended action corresponds to sending an email to schedule a meeting with a particular contact, the autogenerated plan provided by the LLM chatbot service 152 may include a sequence of steps identifying the order or manner in which the personalization agent service 400 should retrieve or otherwise analyze calendar data for the particular contact or other prospective meeting attendees to identify availability, identify a particular date, time and/or location for the meeting based on the calendar data, retrieve the email addresses or other information associated with the particular contact or other prospective meeting attendees from the corresponding contact data records 114 in the database 106, and then automatically generate the textual content for the email to be sent to the retrieved email addresses using the LLM chatbot service 152.

After receiving a new autogenerated plan for performing the intended action from the LLM chatbot 152, the agent management component 410 provides the plan to a plan validation component 412 of the personalization agent service 400, which generally represents the software component of the personalization agent service 400 that interacts with the contextual personalization service 402 to verify or otherwise confirm that the plan aligns or otherwise conforms with the particular user based on the user data 406 maintained in the database 106. In this regard, in exemplary implementations, the contextual personalization service 402 stores or otherwise maintains user profile data 462 associated with a respective user having a corresponding personal model 460, where the user profile data 462 includes user-specific information indicative of the user's personal preferences or settings. For example, in the context of a CRM virtual application 140, the user profile data 462 may include information identifying different sales objectives or other CRM-related objectives for the user for different timeframes or contexts. In this regard, a user may define different objectives for different time periods, such as, for example, maximizing new sales or some other CRM-related metric within an upcoming quarter or other shorter term time period, while maximizing revenue growth or some other CRM-related metric year over year or some other longer term time period. In this regard, the plan validation component 412 may validate the new autogenerated plan provided by the agent management component 410 aligns with the individual user's objectives. Additionally, the user profile data 462 may include other user preference information, including, but not limited to, preferred vendors or third parties, blacklisted vendors or third parties, corporate governance parameters or factors, social equity parameters or factors, and/or the like, which, in turn, may be utilized by the plan validation component 412 validate that the new autogenerated plan provided by the agent management component 410 aligns with the individual user's personal preferences.

Still referring to FIG. 4, when the plan validation component 412 fails to validate the new plan against the user profile data, in one or more exemplary implementations, the plan validation component 412 provides an indication to the agent management component 410 that the plan failed validation along with information identifying the particular reason or rationale for which the plan failed validation. In this regard, the plan validation component 412 may retrieve or otherwise obtain the relevant subset of the user profile data 462 relating to the failed validation and provide the relevant subset of the user profile data 462 to the agent management component 410. The agent management component 410 may utilize the subset of the user profile data 462 provided by the plan validation component 412 to further ground or otherwise augment a subsequent input prompt asking how to perform the intended action to be provided to the LLM chatbot service 152 that includes additional information specific to the particular user to tailor the resulting response in a manner that is more likely to align with the user profile data 462. In this regard, the agent management component 410 and the plan validation component 412 may be cooperatively configured to iteratively adjust the input prompt provided to the LLM chatbot 152 until arriving a validated new autogenerated plan for achieving the intended action previously identified by the agent management component 410. After validating the plan, the personalization agent service 400 may automatically provide the validated plan to the contextual personalization service 402 to store or otherwise maintain the validated autogenerated plan in the database 106 as a prior plan 464 associated with the particular user.

After arriving at a validated plan for achieving the intended action, the plan validation component 412 provides the validated new autogenerated plan to an execution agent component 414, which generally represents the software component of the personalization agent service 400 that sequentially executes the steps or sub-actions of the plan in the defined order to arrive at a result corresponding to performance of the intended action in the manner dictated by the autogenerated plan. In exemplary implementations, for each constituent step or sub-action of the plan, the execution agent component 414 may interact with the contextual personalization service 402 to verify or otherwise confirms the individual constituent action to be performed by the execution agent component 414 is consistent with or otherwise aligns with the user data 406 maintained in the database 106 prior to performing the respective step. For example, the user profile data 462 may include security data or preferences, privacy data or preferences, and other information that may be utilized by the contextual personalization service 402 to analyze, assess or otherwise determine a risk associated with performance of the respective step by the execution agent component 414. In this regard, when the contextual personalization service 402 identifies a risk metric associated with a particular step or sub-action of the plan is greater than a notification threshold or otherwise fails to satisfy the applicable risk or permissions logic, the contextual personalization service 402 may provide a corresponding indication to the execution agent component 414 to pause execution of the respective step until receiving authorization from the user (e.g., human-in-the-loop). In such scenarios, the execution agent component 414 may interact with the virtual application 140 and/or chatbot service 142 to automatically generate a conversational response or other user notification that includes information characterizing or otherwise pertaining to the particular risk associated with the respective step or sub-action for user approval in connection with a button or similar GUI element for receiving user authorization to proceed with execution of the respective step or sub-action.

When the execution agent component 414 determines the particular step or sub-action of the plan is authorized or otherwise permitted based on the user data 406, the execution agent component 414 automatically interacts with the LLM chatbot 152 or another auxiliary service 404 to facilitate performance of the respective step or sub-action. In this regard, the auxiliary service 404 generally represents an API or other service associated with the application platform 124 at the database system 102 or another external computing system 150 that is capable of providing a response to the execution agent component 414 that includes textual content or other data or information responsive to a particular request provided by the execution agent component 414.

For example, for a step or sub-action associated with scheduling a meeting, the execution agent component 414 may utilize an API associated with an external or third party calendar service 404 on the network 110 to obtain data indicative of the events and respective timing of the events for a particular meeting attendee. Thereafter, in a subsequent step or sub-action, the execution agent component 414 may provide the obtained calendar data to an API associated with a scheduling algorithm or service 404 configurable to identify a particular date and/or time for scheduling the meeting based on the calendar data. To invite participants to the meeting, the execution agent component 414 may utilize an API associated with the application platform 124 to obtain email addresses or other contact information from the appropriate contact data records 114 in the database 106. Thereafter, the execution agent component 414 may provide an input prompt to the LLM chatbot 152 that includes the meeting scheduling information to obtain a corresponding conversational response from the LLM chatbot 152 including autogenerated textual content for a body of an email to be sent to the meeting invitees. In this regard, in some implementations, the execution agent component 414 may retrieve and utilize supplemental data from the user's personal model 460 to facilitate generating the textual content in a manner that reflects the individual user's knowledge, experience, grammar, usage and other personal preferences or idiosyncrasies, such that the autogenerated textual content emulates the individual user. The execution agent component 414 may then utilize an API associated with the application platform 124 to automatically generate an email and corresponding email data record 114 in the database 106 having a body populated with the autogenerated textual content from the LLM chatbot 152 conveying the scheduling information and a to field (or destination address field) that is populated with the email addresses previously obtained from the appropriate contact data records 114 in the database 106. In this manner, the execution agent component 414 sequentially executes the steps or sub-actions of the plan previously generated by the agent management component 410 using the LLM chatbot 152 to arrive at a result (e.g., an email data record 114) that corresponds to performance of the intended action (e.g., sending an email to schedule a meeting).

Still referring to FIG. 4, the illustrated implementation of the personalization agent service 400 includes a response generation component 416 (or response generator), which generally represents software component of the personalization agent service 400 that is configured to automatically generate a conversational response or other user notification for the user indicative of performance of the intended by the personalization agent service 400. For example, in situations where the personalization agent service 400 is initiated in response to a conversational user input from the user in the context of an interaction with the virtual application 140 and/or the chatbot 142, the response generation component 416 may generate a corresponding conversational response to the user within the context of the same conversation, for example, as an utterance that follows or is otherwise responsive to the conversational user input that triggered the personalization agent service 400 within a chat window or other GUI display associated with the virtual application 140 and/or the chatbot 142. In other implementations, the response generation component 416 may automatically generate a push notification or other notification provided to the user at the client device 108. For example, after automatically generating an email for scheduling a meeting with a particular contact, the response generation component 416 may automatically generate a push notification or other notification that indicates the email record 114 has been created with a button or other selectable GUI element that the user can manipulate or otherwise interact with to review or preview the email corresponding to the email record 114 prior to manually initiating transmission of the email to the desired meeting invitee(s). In exemplary implementations, the response generator 416 interacts with the contextual personalization service 402 to generate a response or other user notification to the user in a manner that is consistent with the individual's preferences, settings or other configurations indicated by the user profile 462, and/or with content of the respective response or user notification that reflects the user's background knowledge, experience, and other personal preferences or idiosyncrasies.

FIG. 5 depicts an exemplary personalized automation process 500 that may be implemented or otherwise performed to automatically or autonomously perform actions on behalf of an individual user in a personalized or user-specific manner using chatbot or other AI system and perform additional tasks, functions, and/or operations described herein. In one or more implementations, the personalized automation process 500 is implemented or otherwise performed by a personalization agent service 400, which may be integrated with the chatbot service 142 or another service associated with a virtual application 140 at an application platform 124 that provides personalization or customization models as service (e.g., models as a service (MaaS)) between a client-side system (e.g., client device 108) and a LLM chatbot 152 or other destination AI system responsible for generating a conversational response. For illustrative purposes, the following description may refer to elements mentioned above in connection with FIGS. 1-4. It should be appreciated that the personalized automation process 500 may include any number of additional or alternative tasks, the tasks need not be performed in the illustrated order and/or the tasks may be performed concurrently, and/or the personalized automation process 500 may be incorporated into a more comprehensive procedure or process having additional functionality not described in detail herein. Moreover, one or more of the tasks shown and described in the context of FIG. 5 could be omitted from a practical implementation of personalized automation process 500 as long as the intended overall functionality remains intact.

Referring to FIG. 5, with continued reference to FIGS. 1-4, the personalized automation process 500 is initiated or otherwise performed in response to receiving a conversational user input indicative of a desire to trigger an automated action by a personalized automation agent service associated with an application platform of a database system or another triggering event at the database system (e.g., CRUD operation with respect to a particular data record). The personalized automation process 500 begins by identifying or otherwise determining a current objective or intent of the user indicative of an intended action to be performed by the personalized automation agent service and automatically generating an input prompt for an execution plan corresponding to the intended action associated with the current user objective or intent using the personal user data associated with the user (tasks 502, 504). For example, as described above, when the personalized automation process 500 is initiated in response to receiving a conversational user input from a client device 108 via a chatbot service 142, the personalization agent service 400 performs NLP or other linguistic analysis techniques to determine or otherwise derive the current intent or objective of the user indicated by the textual content of the conversational user input and identify a corresponding action that the user intends to perform. In this regard, in some implementations, in addition to analyzing the textual content of the conversational user input, the individual user's personal model 460 or other user profile data 462 may be utilized by the agent management component 410 to identify the action that the user most likely intends to have performed by the personalization agent service 400. In other implementations, when the personalized automation process 500 is initiated in response to a CRUD operation or other event at the database system 102, the personalization agent service 400 may utilize the user profile data 462 or other user data 406 including rules, logic or other criteria indicative of the action to be performed in response to a particular triggering event.

After identifying the intended action to be performed, the agent management component 410 of the personalization agent service 400 utilizes the user's personal model 460, prior execution plans 464 and potentially other user data 406 maintained in the database 106 to generate a grounded personalized input prompt requesting an execution plan for performing the intended action to be provided to the LLM chatbot 152 or another suitable AI system, such as a GPT-based chatbot or the like. In this regard, the subject matter described herein is not limited to any particular type of chatbot or AI system or AI techniques to be implemented by the system or service invoked to generate the execution plan, where the system or service invoked may be implemented at the database system 102 or an external computing system 150 on the network 110. After generating a personalized input prompt for performing the intended action that is grounded with information from the user's personal model 460 or prior execution plans 464, the agent management component 410 of the personalization agent service 400 transmits or otherwise provides the grounded personalized input prompt to the LLM chatbot 152 to receive a corresponding conversational response from the LLM chatbot 152 that includes textual content indicative of a sequence of steps or sub-actions to be executed to achieve the intended action by the user.

The personalization agent service 400 receives or otherwise obtains the execution plan for performing the intended action corresponding to the user's current objective from an AI system using the generated prompt and then verifies or otherwise confirms that the execution plan aligns with the individual user on whose behalf the action is being performed (tasks 506, 508). In this regard, after receiving the execution plan from the LLM chatbot 152 or other external AI system 150, a plan validation component 412 of the personalization agent service 400 validates the execution plan against the individual user's profile data 462 and/or other user data 406 maintained in the database 106. For example, the plan validation component 412 of the personalization agent service 400 may verify or otherwise confirm that a step of the execution plan does not involve use of an auxiliary service 404 that is blacklisted by the user or associated with a third party system 150 blacklisted by the user. Additionally or alternatively, the plan validation component 412 of the personalization agent service 400 may verify or otherwise confirm that a step of the execution plan does not involve use of an auxiliary service 404 or third party system 150 where an another auxiliary service 404 or third party system 150 that is more preferred by the individual user is capable of analogously performing the same step of the execution plan. In this manner, the plan validation component 412 may verify and validate an execution plan that utilizes auxiliary services 404 or third party systems 150 that align with the individual user's corporate governance preferences, social equity preferences, vendor preferences, third party preferences, and other parameters or factors indicative of the individual user's values or beliefs. When the execution plan fails to be validated, the personalization agent service 400 iteratively repeats the loop defined by tasks 504, 506 and 508 to iteratively and dynamically adjust the input prompt to include additional grounding user data 406 until arriving at an execution plan that aligns with the individual user's profile or preferences defined at the database system 102.

After validating the execution plan, the personalization agent service 400 continues by sequentially executing the constituent steps or sub-actions of the execution plan in the defined order to achieve a result corresponding to performance of the intended action by the user and then automatically provides a corresponding response to the user indicative of performance of the intended action (tasks 510, 512). As described above in the context of FIG. 4 and in greater detail below in the context of FIG. 6, the execution agent component 414 of the personalization agent service 400 sequentially executes respective steps of the execution plan by obtaining the respective user data 406 and/or other data from the user's associated data records 114 at the database system 102 and invoking the LLM chatbot 152 and/or other auxiliary services 404 to perform the respective steps of the execution plan using the relevant values or fields of the user's data obtained from the database 106 to ultimately achieve a final result or response from the LLM chatbot 152 and/or auxiliary service 404 corresponding to performance of the intended action using the relevant subset of the user's data maintained in the database 106. Thereafter, the personalization agent service 400 may perform one or more CRUD operations at the database 106 indicative of or otherwise corresponding to performance of the intended action, and the response generator 416 may automatically generate a conversational response, a push notification, or another user notification indicative of the action that was automatically and/or autonomously performed by the personalization agent service 400.

FIG. 6 depicts an exemplary personalized agent execution process 600 suitable for implementation in connection with the personalized automation process 500 to execute steps of an execution plan and perform additional tasks, functions, and/or operations described herein. In one or more implementations, the personalized agent execution process 600 is implemented or otherwise performed by a personalization agent service 400, which may be integrated with the chatbot service 142 or another service associated with a virtual application 140 at an application platform 124 that provides personalization or customization models as service between a client-side system (e.g., client device 108) and a LLM chatbot 152 or other destination AI system responsible for generating a conversational response. For illustrative purposes, the following description may refer to elements mentioned above in connection with FIGS. 1-5. It should be appreciated that the personalized agent execution process 600 may include any number of additional or alternative tasks, the tasks need not be performed in the illustrated order and/or the tasks may be performed concurrently, and/or the personalized agent execution process 600 may be incorporated into a more comprehensive procedure or process having additional functionality not described in detail herein. Moreover, one or more of the tasks shown and described in the context of FIG. 6 could be omitted from a practical implementation of personalized agent execution process 600 as long as the intended overall functionality remains intact.

Referring to FIG. 6, with continued reference to FIGS. 1-5, the personalized agent execution process 600 begins by automatically generating a prompt for performing a respective step of the execution plan and receiving a corresponding response including information or data for performing the step using the generated prompt (task 602, 604). In this regard, for each step or sub-action of the execution plan, the execution agent component 414 may interact with the contextual personalization service 402 to obtain a relevant subset of user data 406 to be utilized for grounding an input prompt to the LLM chatbot 152 and then automatically generates a corresponding input prompt requesting code, instructions or other information for performing a respective step of the execution plan using the textual content of the respective step and the grounding subset of user data 406. In response, the LLM chatbot 152 may provide code, commands or other instructions to the execution agent component 414 with a structure and/or format that is ready for execution or is otherwise capable of being converted into an executable format by the execution agent component 414. For example, the LLM chatbot 152 may provide a command, code or other instructions for invoking or making an API call to a particular auxiliary service 404 along with a corresponding network address for locating the particular service 404 on the network 110.

After receiving an executable response for the execution step, the personalized agent execution process 600 verifies or otherwise confirms that the executable response is aligned with the individual user's profile or settings before invoking the particular service for performing execution of the respective execution step using the executable response (tasks 606, 608). In this regard, when the executable response received from the LLM chatbot 152 aligns with the individual user's profile data 462 and/or personal model 460, the execution agent component 414 executes or otherwise performs the executable response from the LLM chatbot 152 to invoke an auxiliary service 404 to perform the respective step of the execution plan. As described above, in some implementations, the execution agent component 414 calculates or otherwise determines a risk metric associated with performance of the respective execution step based on the executable response using the user data 406 to verify or otherwise confirm that the respective execution step does not violate any risk thresholds or other permissions or settings associated with the user.

After performing a respective step of the execution plan, the personalized agent execution process 600 determines whether or not the execution plan has been completed, and if not, repeats the loop defined by tasks 602, 604, 606, 608 and 610 to sequentially execute each step of the execution plan until reaching the end of the execution plan sequence. In this regard, when the executable response from the LLM chatbot or other AI system for a respective step does not align with the individual user's profile or settings or otherwise violates applicable risk thresholds, permissions or settings, the personalized agent execution process 600 continues by identifying or otherwise determining whether an alternative for performing the respective execution step that is also aligned with the user's profile is available or otherwise exists. In this regard, when a particular response from the LLM chatbot 152 is not aligned with the user's profile or otherwise violates a risk threshold or setting associated with the user, the execution agent component 414 may utilize the user's personal model 460, profile data 462 and/or other user data 406 to identify an alternative for performing the respective step. For example, the execution agent component 414 may interact with the contextual personalization service 402 to obtain a relevant subset of user data 406 to be utilized for augmenting or otherwise modifying the grounding data provided with the input prompt to the LLM chatbot 152 in a manner that is likely to cause the LLM chatbot 152 to generate an executable response that is aligned with the individual user's profile or settings.

When an alternative is available, the personalized agent execution process 600 invokes the alternative service for performing execution of the respective execution step using the alternative executable response (task 614), before repeating the loop defined by tasks 602, 604, 606, 608, 610 and 614 to continue progressing through the execution plan. On the other hand, when an alternative is unable to be automatically or autonomously identified, the personalized agent execution process 600 automatically generates or otherwise provides notification to the user indicative of the misaligned step of the execution plan (task 616). In this regard, the execution agent component 414 may interact with the response generator 416 to automatically generate a conversational response, a push notification, or another user notification indicative of the misalignment associated with a respective execution step for the execution plan. For example, the user notification may include information identifying the potential risk(s) associated with performing the respective execution step or otherwise identify the particular corporate governance preferences, social equity preferences, vendor preferences, third party preferences, and other parameters or factors that are implicated by the respective execution step. Accordingly, the user may be provided with the opportunity to authorize the personalization agent service 400 to proceed with the respective execution step, and thereby enable the user to control the behavior or manner in which the personalization agent service 400 achieves the user's intended action. In this regard, when the user authorizes performance of a misaligned step, the loop defined by tasks 602, 604, 606, 608, 610 and 614 may continue until completion of the execution plan.

Still referring to FIG. 6, after completion of the execution plan, the illustrated personalized agent execution process 600 automatically generates or otherwise provides a response to the user indicative of performance of the intended action (task 612). For example, as described above, after the execution agent component 414 performs one or more CRUD operations at the database 106 associated with the final step of an execution plan, the execution agent component 414 may provide a corresponding indication to the response generator 416 that the execution plan has been completed with one or more record identifiers or other field values associated with the data record(s) 114 at the database 106 corresponding to the result or completion of the execution plan. The response generator 416 may utilize the record identifier(s) and/or field value(s) provided by the execution agent component 414 to generate or otherwise provide a conversational response, push notification, or other user notification at the client device 108 (e.g., within the context of an instance of the virtual application 140 executing within the client application 109) that includes information identifying the data record(s) 114 associated with user's intended action and/or the new, modified and/or updated field value(s) for the respective data record(s) 114 influenced by performance of the intended action. In this manner, the user may review or otherwise confirm that the action performed by the personalization agent service 400 aligns with the user's expectations or otherwise corresponds to the action that the user intended to be performed in the manner that the user would like the action to be performed (e.g., by aligning with the user's preferences in terms of corporate governance, social equity, vendors, third parties, risk, and the like).

By virtue of the personalization agent service 400 described herein in the context of FIGS. 4-6, actions may be autonomously and automatically performed by an application platform 124 at a database system 102 using one or more services 152, 404 associated with the database system 102 and/or external to the database system 102 to achieve a desired action intended by an individual user in a manner that aligns with the individual user's beliefs, values, preferences or other settings and profile data. Moreover, by incorporating a contextual personalization service 402 capable of utilized one or more personal models 460 created on behalf of the user as described above in the context of FIGS. 1-3, any automated or autonomous action may be tailored in a manner that reflects the individual user's knowledge, education, experience, background, behavior and/or the like. In this regard, the result of the personalization agent service 400 may automatically and autonomously emulate the individual user without any involvement by the user, thereby saving the user's time with respect to performing actions at the database system 102 (e.g., sending emails, scheduling meetings, placing orders, sending invoices, and/or the like) while ensuring alignment with the user's beliefs, preferences or other value system.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as services) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
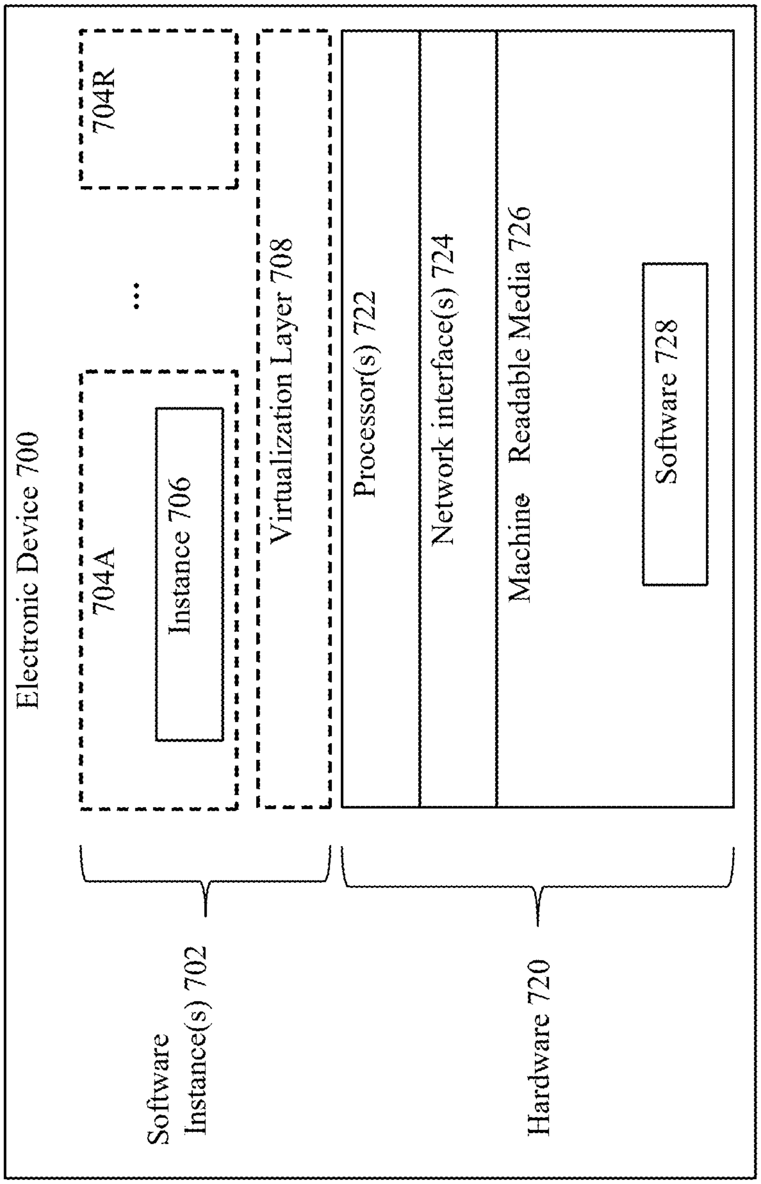
FIG. 7A is a block diagram illustrating an electronic device according to some exemplary implementations.

FIG. 7A is a block diagram illustrating an electronic device 700 according to some example implementations.

FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable media. Each of the previously described clients, server-side services (e.g., chatbot service 142, etc.) and client-side services may be implemented in one or more electronic devices 700. In one implementation: 1) each of the clients is implemented in a separate one of the electronic devices 700 (e.g., in end user devices where the software 728 represents the software to implement clients to interface directly and/or indirectly with the server-side services and/or client-side services (e.g., software 728 represents a web browser, a native client, a portal, a command-line interface, and/or an application programming interface (API) based upon protocols such as Simple Object Access Protocol (SOAP), Representational State Transfer (REST), etc.)); 2) the server-side services and/or client-side services is implemented in a separate set of one or more of the electronic devices 700 (e.g., a set of one or more server devices where the software 728 represents the software to implement the server-side services and/or client-side services); and 3) in operation, the electronic devices implementing the clients and the server-side services and/or client-side services would be communicatively coupled (e.g., by a network) and would establish between them (or through one or more other layers and/or or other services) connections for submitting requests to the server-side services and/or client-side services. Other configurations of electronic devices may be used in other implementations.

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where computer virtualization is used, during operation, an instance of the software 728 is executed within the software container 704A on the virtualization layer 708. In electronic devices where computer virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

Figure 7B:
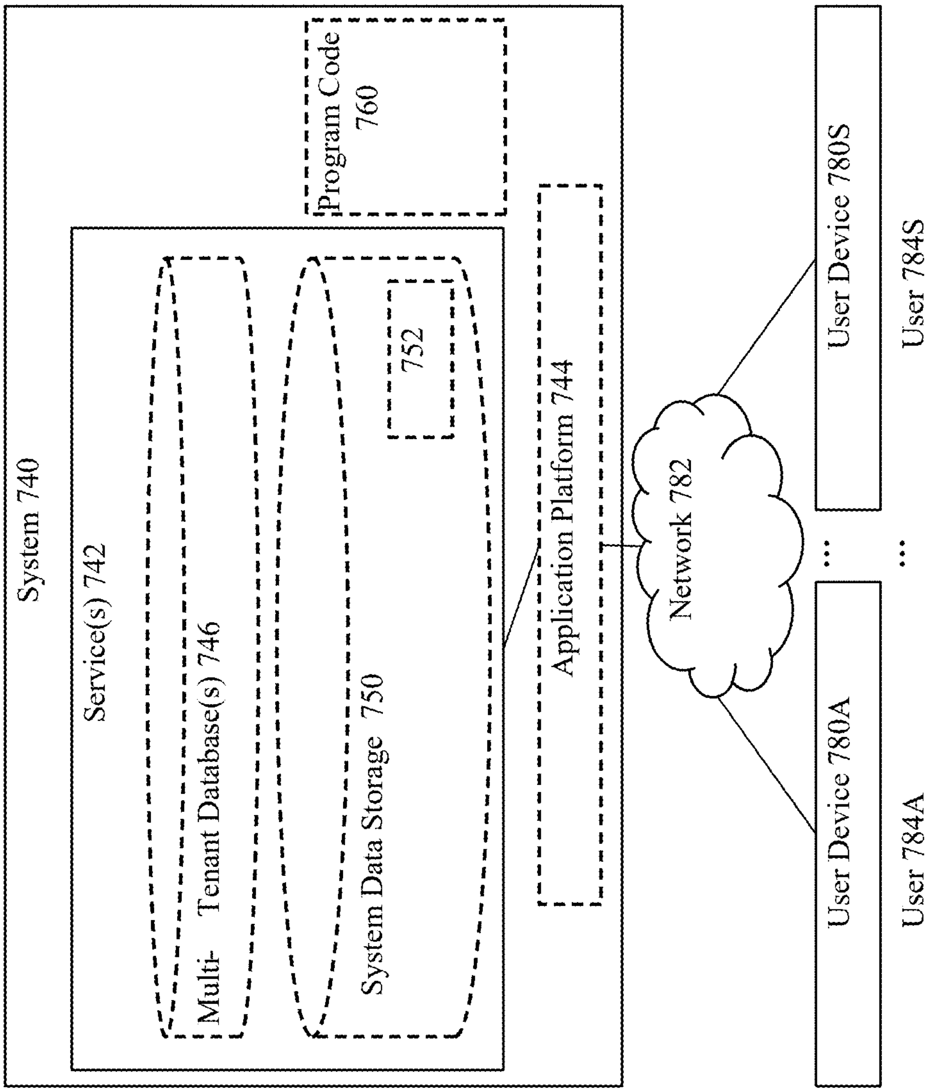
FIG. 7B is a block diagram of a deployment environment according to some exemplary implementations.

FIG. 7B is a block diagram of a deployment environment according to some example implementations. A system 740 includes hardware (e.g., a set of one or more server devices) and software to provide service(s) 742, including server-side services and/or client-side services. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-780S over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 740 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the server-side services and/or client-side services, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP) or HTTP Secure (HTTPS), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method comprising:

determining, at a database system, an action to be performed on behalf of a user of a client device coupled to the database system over a network;

identifying, at the database system, a relevant subset of data in a database of the database system associated with the user based on the action;

generating, at the database system, a personalized input prompt for an execution plan for how to autonomously perform the action by an application platform at the database system using the relevant subset of data;

providing the personalized input prompt to a large language model (LLM) service configurable to generate a personalized conversational response comprising a sequence of steps for the execution plan using the relevant subset of data, the sequence of steps comprising one or more sub-actions to be performed by one or more services at the database system or an external system to autonomously perform the action;

receiving, at the database system, the personalized conversational response comprising textual content indicative of the sequence of steps of the execution plan from the LLM service;

automatically executing, by the database system, the steps of the execution plan in by the application platform automatically interacting with the one or more services in accordance with the sequence to perform the one or more sub-actions to achieve the action with respect to a data record in the database at the database system; and automatically providing, by the database system, a response to the client device indicative of the action with respect to the data record at the database system.

2. The method of claim 1, wherein:

identifying the relevant subset of data comprises identifying a prior execution plan associated with the user based on a relationship between the action and a prior action associated with the prior execution plan; and generating the personalized input prompt comprises grounding an input prompt for the execution plan for the action using the prior execution plan.

3. The method of claim 1, further comprising validating the sequence of steps of the execution plan align with user data associated with the user in the database prior to automatically executing the steps of the execution plan.

4. The method of claim 3, further comprising:

augmenting the personalized input prompt using user profile data associated with the user in response to misalignment between the sequence of steps of the execution plan and the user profile data, resulting in an augmented personalized input prompt; and providing the augmented personalized input prompt to the LLM service configurable to generate a second personalized conversational response comprising an adjusted sequence of steps for the execution plan, wherein automatically executing the steps of the execution plan comprises automatically executing the adjusted sequence of steps of the execution plan in accordance with the adjusted sequence.

5. The method of claim 1, wherein automatically executing the steps of the execution plan comprises:

generating an input prompt for execution information for a respective step of the execution plan;

providing the input prompt to the LLM service;

receiving, from the LLM service, an executable response to the input prompt for performing the respective step of the execution plan; and executing, at the database system, the executable response to invoke an auxiliary service for performing the respective step of the execution plan.

6. The method of claim 5, further comprising:

obtaining a subset of user profile data relevant to the respective step of the execution plan; and grounding the input prompt using the subset of user profile data prior to providing the input prompt to the LLM service.

7. The method of claim 1, wherein the one or more services at the database system or the external system comprise at least one of an auxiliary service preferred by the user or a third party system preferred by the user identified based on the relevant subset of data in the database.

8. The method of claim 1, wherein automatically executing the steps of the execution plan comprise the application platform sequentially invoking the one or more services in accordance with the sequence to perform the one or more sub-actions using values or fields of the user's data obtained from the database and thereafter perform a create, read, update, or delete (CRUD) operation with respect to the data record indicative of the action.

9. The method of claim 1, wherein automatically executing the steps of the execution plan comprises, for each respective step of the execution plan, validating the respective step of the execution plan aligns with user data associated with the user in the database prior to executing the respective step of the execution plan.

10. At least one non-transitory machine-readable storage medium that provides instructions that, when executed by at least one processor, are configurable to cause the at least one processor to perform operations comprising:

determining an action to be performed on behalf of a user of a client device coupled to a database system over a network;

identifying a relevant subset of data in a database of the database system associated with the user based on the action;

generating a personalized input prompt for an execution plan for how to autonomously perform the action by an application platform at the database system using the relevant subset of data;

providing the personalized input prompt to a large language model (LLM) service configurable to generate a personalized conversational response comprising a sequence of steps for the execution plan using the relevant subset of data, the sequence of steps comprising one or more sub-actions to be performed by one or more services at the database system or an external system to autonomously perform the action;

receiving the personalized conversational response comprising textual content indicative of the sequence of steps of the execution plan from the LLM service;

automatically executing the steps of the execution plan by the application platform automatically interacting with the one or more services in accordance with the sequence to perform the one or more sub-actions to achieve the action with respect to a data record in the database at the database system; and automatically providing a response to the client device indicative of the action with respect to the data record at the database system.

11. The at least one non-transitory machine-readable storage medium of claim 10, wherein:

identifying the relevant subset of data comprises identifying a prior execution plan associated with the user based on a relationship between the action and a prior action associated with the prior execution plan; and generating the personalized input prompt comprises grounding an input prompt for the execution plan for the action using the prior execution plan.

12. The at least one non-transitory machine-readable storage medium of claim 10, wherein the instructions are configurable to cause the at least one processor to validate the sequence of steps of the execution plan align with user data associated with the user in the database prior to automatically executing the steps of the execution plan.

13. The at least one non-transitory machine-readable storage medium of claim 12, wherein the instructions are configurable to cause the at least one processor to:

augment the personalized input prompt using user profile data associated with the user in response to misalignment between the sequence of steps of the execution plan and the user profile data, resulting in an augmented personalized input prompt; and provide the augmented personalized input prompt to the LLM service configurable to generate a second personalized conversational response comprising an adjusted sequence of steps for the execution plan, wherein automatically executing the steps of the execution plan comprises automatically executing the adjusted sequence of steps of the execution plan in accordance with the adjusted sequence.

14. The at least one non-transitory machine-readable storage medium of claim 10, wherein the instructions are configurable to cause the at least one processor to automatically execute the steps of the execution plan by:

generating an input prompt for execution information for a respective step of the execution plan;

providing the input prompt to the LLM service;

receiving, from the LLM service, an executable response to the input prompt for performing the respective step of the execution plan; and executing the executable response to invoke an auxiliary service for performing the respective step of the execution plan.

15. The at least one non-transitory machine-readable storage medium of claim 14, wherein the instructions are configurable to cause the at least one processor to:

obtain a subset of user profile data relevant to the respective step of the execution plan; and ground the input prompt using the subset of user profile data prior to providing the input prompt to the LLM service.

16. The at least one non-transitory machine-readable storage medium of claim 14, wherein the instructions are configurable to cause the at least one processor to validate the executable response aligns with user data associated with the user in the database prior to executing the executable response.

17. The at least one non-transitory machine-readable storage medium of claim 14, wherein the instructions are configurable to cause the at least one processor to validate the auxiliary service associated with the executable response aligns with user data associated with the user in the database prior to executing the executable response.

18. The at least one non-transitory machine-readable storage medium of claim 10, wherein automatically executing the steps of the execution plan comprises, for each respective step of the execution plan, validating the respective step of the execution plan aligns with user data associated with the user in the database prior to executing the respective step of the execution plan.

19. A computing system comprising:

at least one non-transitory machine-readable storage medium that stores software; and at least one processor, coupled to the at least one non-transitory machine-readable storage medium, to execute the software that implements a personalization agent service and that is configurable to perform operations comprising:

determining an action to be performed on behalf of a user of a client device coupled to a database system over a network;

identifying a relevant subset of data in a database of the database system associated with the user based on the action;

generating a personalized input prompt for an execution plan for how to autonomously perform the action by an application platform at the database system using the relevant subset of data;

providing the personalized input prompt to a large language model (LLM) service configurable to generate a personalized conversational response comprising a sequence of steps for the execution plan using the relevant subset of data, the sequence of steps comprising one or more sub-actions to be performed by one or more services at the database system or an external system to autonomously perform the action;

receiving the personalized conversational response comprising textual content indicative of the sequence of steps of the execution plan from the LLM service;

automatically executing the steps of the execution plan by the application platform automatically interacting with the one or more services in accordance with the sequence to perform the one or more sub-actions to achieve the action with respect to a data record in the database at the database system; and automatically providing a response to the client device indicative of the action with respect to the data record at the database system.

20. The computing system of claim 19, wherein the LLM service comprises a chatbot service at the external system coupled to the database system over the network, wherein the chatbot service is configured to generate the personalized conversational response using at least one of a large language model (LLM) or a generative pre-trained transformer (GPT) model.

* * * * *